US012169173B2

United States Patent
Joly et al.

(10) Patent No.: US 12,169,173 B2
(45) Date of Patent: Dec. 17, 2024

(54) OPTICAL INTERROGATION SYSTEM AND METHOD

(71) Applicant: UNIVERSITÉ LAVAL, Québec (CA)

(72) Inventors: Maxime Joly, Québec (CA); André Bégin-Drolet, Québec (CA); Jesse Greener, Québec (CA); Tianyang Deng, Guangzhou (CN)

(73) Assignee: UNIVERSITÉ LAVAL, Quebec (CA)

( * ) Notice: Subject to any disclaimer, the term of this patent is extended or adjusted under 35 U.S.C. 154(b) by 192 days.

(21) Appl. No.: 17/927,798

(22) PCT Filed: May 27, 2021

(86) PCT No.: PCT/CA2021/050718
§ 371 (c)(1),
(2) Date: Nov. 25, 2022

(87) PCT Pub. No.: WO2021/237357
PCT Pub. Date: Dec. 2, 2021

(65) Prior Publication Data
US 2023/0213441 A1    Jul. 6, 2023

Related U.S. Application Data

(60) Provisional application No. 63/031,248, filed on May 28, 2020.

(51) Int. Cl.
*G01N 21/35* (2014.01)
*G01N 21/3577* (2014.01)
*G01N 21/552* (2014.01)

(52) U.S. Cl.
CPC ....... *G01N 21/3577* (2013.01); *G01N 21/552* (2013.01); *G01N 2021/3595* (2013.01);
(Continued)

(58) Field of Classification Search
CPC ............ G01N 21/3577; G01N 21/552; G01N 2021/3595
See application file for complete search history.

(56) References Cited

U.S. PATENT DOCUMENTS 3,279,307 A   10/1966  Milks, Jr.
7,057,720 B2  6/2006   Caracci et al.
(Continued)

OTHER PUBLICATIONS

Morhart, Tyler A et al. "Attenuated Total Reflection Fourier Transform Infrared (ATR FT-IR) Spectromicroscopy Using Synchrotron Radiation and Micromachined Silicon Wafers for Microfluidic Applications." Applied spectroscopy vol. 72,12 (2018).
(Continued)

*Primary Examiner* — Hugh Maupin
(74) *Attorney, Agent, or Firm* — Alexandre Daoust; Norton Rose Fulbright Canada LLP

(57) ABSTRACT

The optical interrogation technique can use an optical prism having two opposite sides including a sample side and a refraction side, the sample side having a plurality of interrogation areas; a source assembly generating a collimated field of illumination directed towards the refraction side; a screen disposed in a screen plane intersecting the field of illumination and shielding the refraction side from the field of illumination, the screen having an aperture allowing a portion of the field of illumination to reach and be refracted by the refraction side, be totally internally reflected at one of said interrogation areas of the sample side, thereby generating a signal, the signal refracted back through the aperture, the screen being movable within the screen plane to shift the aperture and expose different portions of the field of illumination to corresponding ones of the interrogation areas.

24 Claims, 15 Drawing Sheets

(52) U.S. Cl.
CPC ............... *G01N 2201/0633* (2013.01); *G01N 2201/104* (2013.01)

(56) References Cited

U.S. PATENT DOCUMENTS

| | | |
|---|---|---|
| 7,582,486 B2 | 9/2009 | Gollier et al. |
| 2004/0033539 A1 | 2/2004 | Schnabel et al. |
| 2004/0046963 A1* | 3/2004 | Lackritz ............... G01N 21/553 356/445 |
| 2008/0158570 A1* | 7/2008 | Gollier ............... G01N 21/7743 356/521 |
| 2016/0355869 A1* | 12/2016 | Blair ................. G01N 21/7746 |
| 2017/0350874 A1 | 12/2017 | Entcheva et al. |
| 2020/0056987 A1 | 2/2020 | Baker et al. |
| 2023/0141082 A1* | 5/2023 | Vörös .................... G01N 21/45 356/300 |

OTHER PUBLICATIONS

Morhart, Tyler et al. Micromachined Multigroove Silicon ATR FT-IR Internal Reflection Elements for Chemical Imaging of Microfluidic Devices. Analytical Methods.(2019).

Kimber, James A. et al. "FTIR spectroscopic imaging and mapping with correcting lenses for studies of biological cells and tissues." Faraday discussions 187 (2016).

Chan, K. L. Andrew et al. Chemical imaging of microfluidic flows using ATR-FTIR spectroscopy. Lab on a chip. (2009).

Maxime Joly, Scanning Aperture Approach for Spatially Selective ATR-FTIR Spectroscopy: Application to Microfluidics, Analytical Chemistry, vol. 93, No. 42, Oct. 12, 2021.

\* cited by examiner

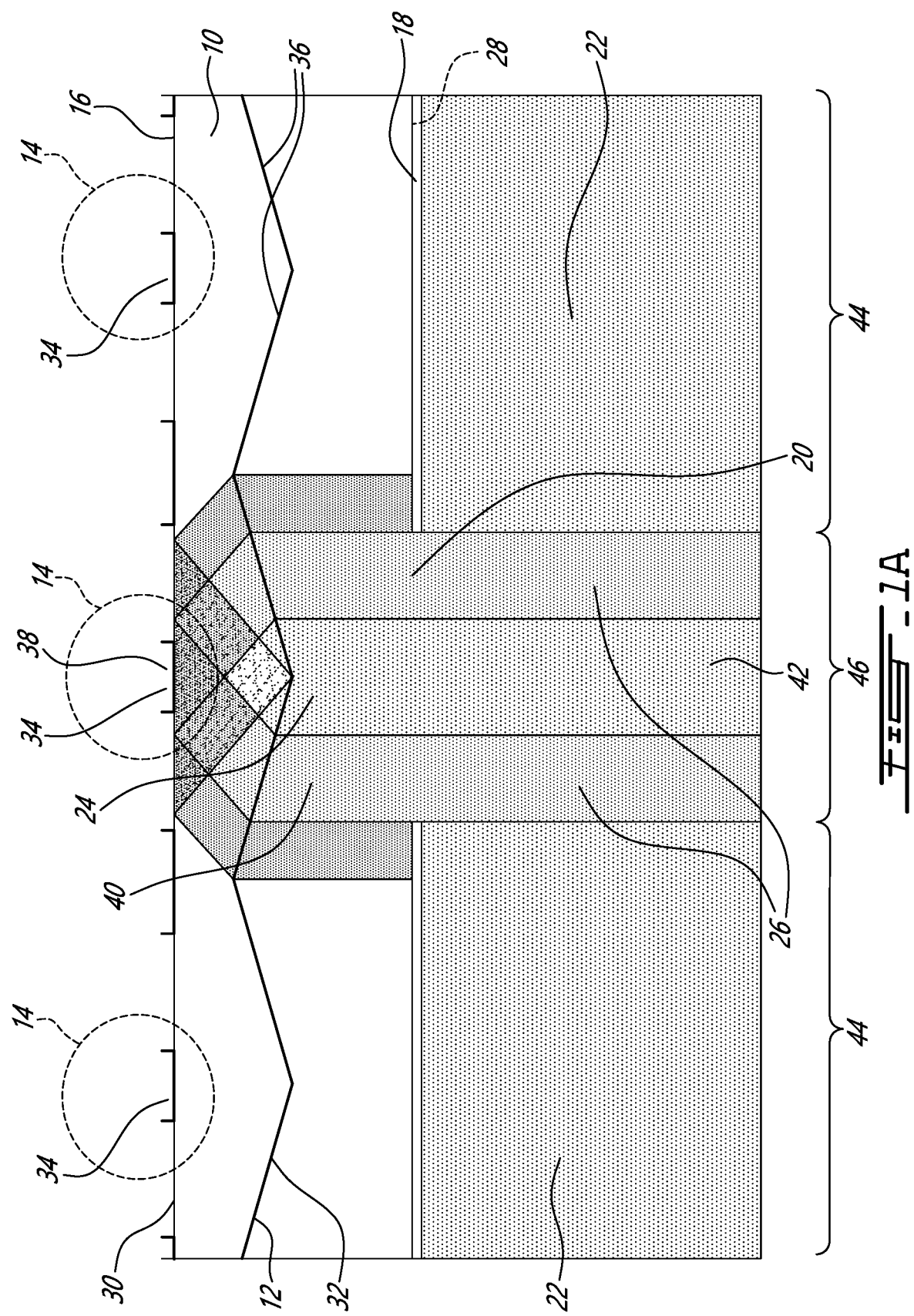

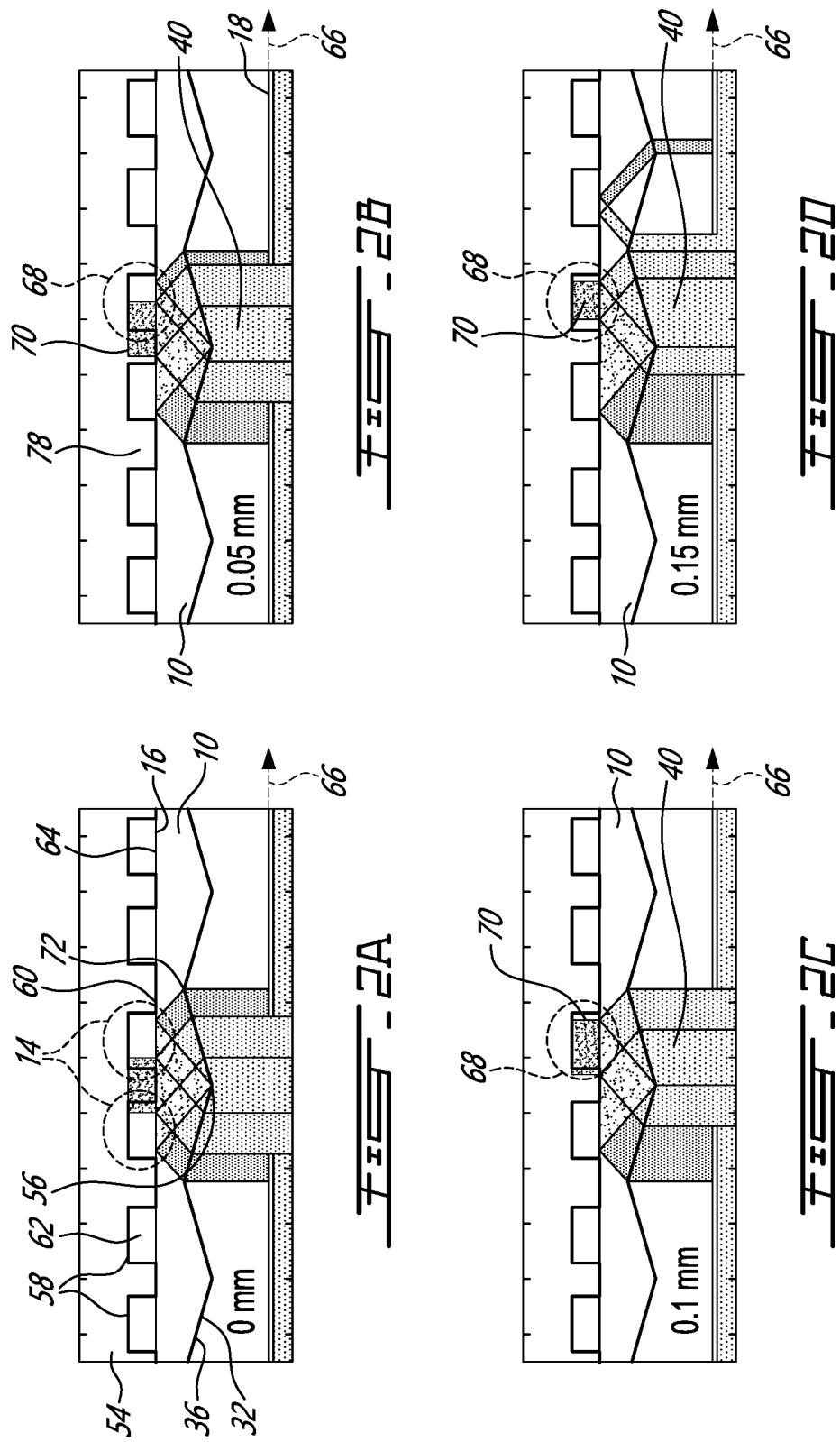

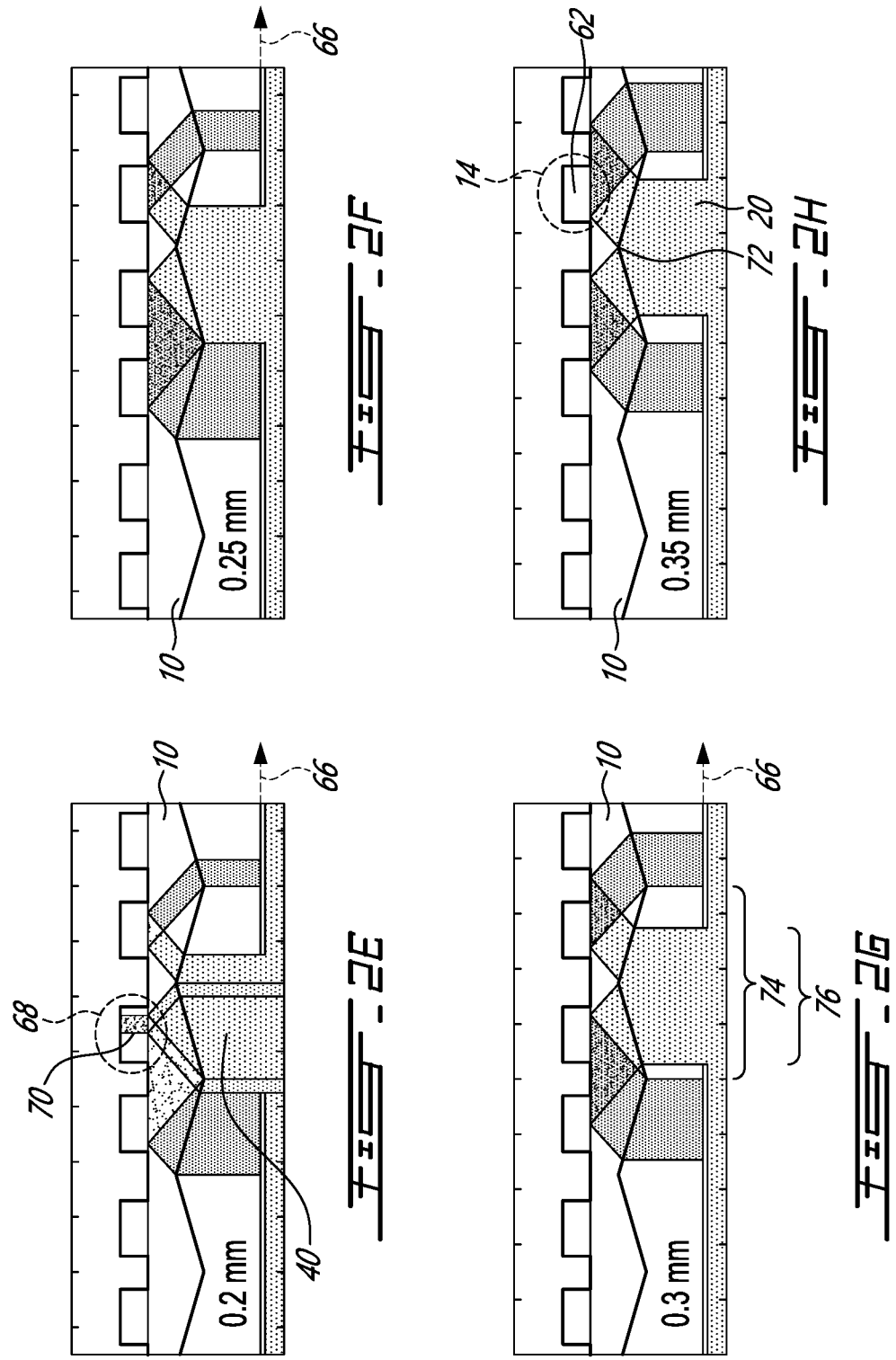

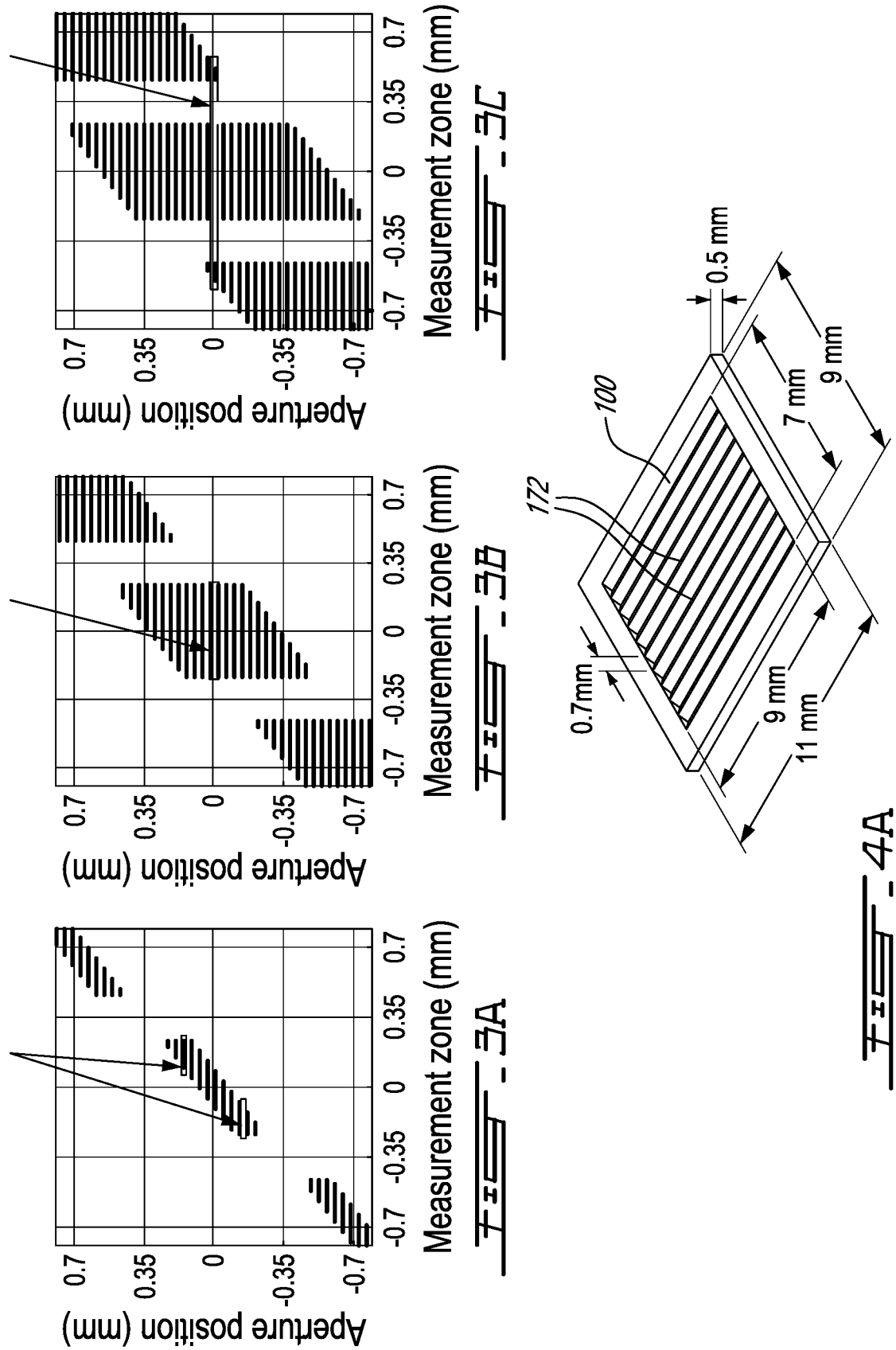

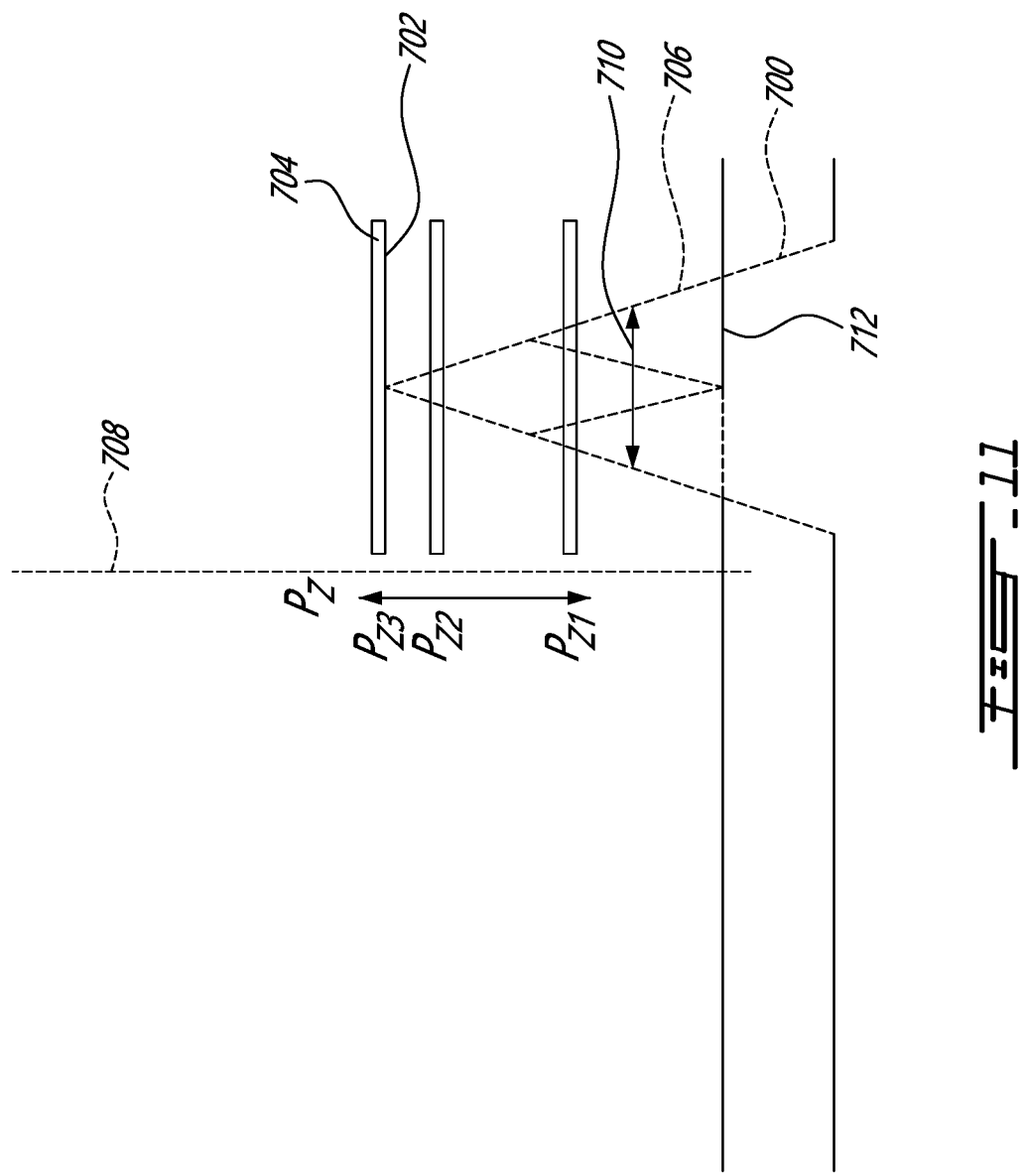

OPTICAL INTERROGATION SYSTEM AND METHOD

BACKGROUND

Optical interrogation techniques are used in various applications, and typically involve generating an excitation in the sample with electromagnetic waves (e.g. visible light, infrared light, UV rays, etc.), and detecting the signal stemming from the excitation. Spectroscopy techniques such as infrared (IR) spectroscopy using an attenuated total reflection (ATR) interrogation technique is one example in which the sample, having a lower index of refraction, is exposed to an evanescent wave that is generated at the boundary of a crystal having a higher index of refraction by total internal reflection. The expression "total internal reflection element" (IRE) is often used interchangeably with "ATR element" or "ATR crystal", to refer to the optical prism responsible for the internal total reflection.

While known optical interrogation techniques were satisfactory to a certain degree, there always remains room for improvement, especially in relation to costs, ease of use, efficiency, and sampling rate.

SUMMARY

Used in a context of IR spectroscopy, an ATR interrogation technique can involve single bounce measurements from a single reflection point at the ATR crystal/sample interface or by multiple bounces by propagating the infrared radiation along the length of the ATR crystal. In either single- or multi-bounce schemes, the light can be coupled into the ATR crystal at a beveled edge with the bevel angle controlling the incident angle of excitation light against the ATR/sample interface. In the multi-bounce case, the radiation can be propagated into one end of the crystal in a manner to take a zig-zag path between opposite sides of the crystal due to total internal reflection and exits out a second beveled edge, where it is detected. In the single-bounce case, the light enters via a beveled edge from a first side, totally internally reflects at the ATR/crystal interface on the opposite side, and then immediately exits out of a second beveled edge. The sample can be positioned along one of the sides, and the evanescent wave can thus interact with the sample at points where the light is totally internally reflected. In the case that the excitation light is modulated by an interferometer, the resulting signal can be analysed using a Fourier transformation (FT), to discern signal strength at individual wavelengths, for instance, but the approach is also applicable for non-FT-based optical techniques as well. The nature of the sample will vary from one embodiment to another. The sample can be continuous liquid samples covering the ATR crystal surface such as a static droplet or a liquid stream, or can be solid materials deposited on the ATR surface, such as powders or continuous solid samples. For instance, such solid materials can be biological tissues or films deposited directly on the face of the crystal. In addition, the sample can be localized at specific regions or in specific patterns against the ATR crystal, as defined by, for example, a microfluidic channel. The ATR crystal is an optical prism, and more specifically an internal reflection element (IRE), and is commonly referred to as the "crystal" given the material, which is typically used in its fabrication. The latter techniques can be effective, and useful to a certain degree, but at least somewhat tedious from the point of view of switching from one sample to another, or to obtain measurements from sub-domains at the crystal/sample interface.

One alternate way of interrogating a sample in ATR-IR is based on the use of an optical prism having a plurality of sloped surfaces machined at the light/crystal interface side (which can be referred to as the refraction side). Using such an optical prism, incident light directed transversally (e.g. normal) to the sample side which is subdivided by the multitude of sloped surfaces to create a series of single-bounce total internal reflections at the sample side. After the resulting evanescent field interacts with the sample at the total internal reflection region(s), the radiation is then directed back at roughly the incident angle to the refraction side, where it leaves the ATR crystal. For the purposes of analysis, the source and the signal paths can be optically separated using suitable optics, allowing to direct the reflected signal to the optical detector.

The latter interrogation concept is interesting because if the optical prism has a plurality of interrogation areas dispersed on the sample side, then displacing a light beam in the plane of the sample side surface, or displacing a field of detection along that plane, can allow selectively targeting individual sub-regions of the interrogation areas, in sequence, without having to switch the samples between each measurement.

In one embodiment, for instance, sub-selecting the region of interest can be achieved by subsampling the emission light with a multitude of detectors (e.g. via a focal plane array detector). However, this can be considered too costly and/or complicated in some embodiments.

In another embodiment, this can be achieved by scanning an excitation beam (including, a focused or collimated beam such as a laser) along the refraction side of the prism for instance. "Scanning" involves a relative displacement between the excitation beam and the prism, which can be achieved by moving the excitation beam while maintaining the prism still, moving the prism while maintaining the excitation beam still, or moving both the prism and the excitation beam in different directions within a same movement plane, for instance. Accordingly, multiple sample sockets, channels, or other sample areas can be simultaneously positioned on the sample side of the prism, and sequentially interrogated via the relative displacement of the incident radiation. This has the benefit of using a standard detector, but scanning the incident beam along the surface of the prism within a satisfactory degree of precision may require somewhat elaborated equipment and be relatively costly, and the latter may defeat some, if not all, of the advantages associated to setting up multiple sample locations at once relative to the prism.

An alternate way of achieving a similar result can, at least in some embodiments, be even more advantageous. One possible example is shown in FIG. 1A, and reference will be made thereto to facilitate understanding. In the example shown, the optical prism 10 has a plurality of adjacent V-shaped ridges 12 between the refraction side 32 and the sample side 16 of the prism 10, each associated to one or more interrogation area 14 on the sample side 16. FIG. 1A shows a cross-section of the refraction prism 10 and the interrogation areas 14 in this case are elongated normal to the plane of the cross-section. Such an alternate way can include generating a field of illumination spanning all the interrogation areas 14 of the prism 10, and positioning a screen 18 having one or more aperture(s) 20 intersecting the field of illumination 22 in a manner to generally intersect the field of illumination 22 ahead of the prism 10 while allowing one or more corresponding portions of the field of illumination 24 to illuminate one (or more) of the interrogation areas 14 of the prism 10 through the corresponding aperture (s) 20. The screen 18 can be opaque to the field of illumination 22, in the sense that it can be non-transparent to the wavelengths of the field of illumination 22, or otherwise allow significantly (measurably) less transmission than the aperture 20, and thereby impede or prevent one or more portions of the field of illumination 24 being adjacent to the aperture 20 from reaching the optical prism 10. This can be done in a manner to interrogate a portion of the sample 34, or a specific sample, as presented above, with at least a portion of the reflected signal 26 travelling back through the aperture(s) 20. Then, by moving either the aperture 20 (i.e. by moving the screen 18) within the plane of the screen 28 (a plane transversal to the direction of the field of illumination 22), and/or by moving the optical prism 10 within a similar orientation, the illuminated portion of the prism 10 can be shifted transversally to interrogate another one of the interrogation areas 14 of the prism 10. Accordingly, by moving the screen 18 and/or the optical prism 10, one can selectively interrogate different sample portions or samples 34, and multiple operations or measurements can be performed before needing to change the sample(s) 34. In at least some embodiments, moving a screen 18 can be significantly simpler, and less costly, to implement than scanning the prism's surface 30 using a narrow laser beam, for instance, while still suitably achieving other objectives such as measurement efficiency. In some embodiments, it can be preferred to use a screen consisting of two halves which are movable independently from one another in a manner to allow not only to displace one or more apertures relative the prism, by moving both halves simultaneously, but further to potentially broaden or narrow the size of the one or more apertures, by moving the halves away, or towards, one another, for instance.

In accordance with one aspect, there is provided an optical interrogation system comprising: an optical prism having two opposite sides including a sample side and a refraction side, the sample side having a plurality of interrogation areas; a source assembly generating a field of illumination directed towards the refraction side; a screen disposed in a screen plane intersecting the field of illumination, the screen being opaque to the field of illumination, the screen having an aperture allowing a portion of the field of illumination to reach and be refracted by the refraction side, be totally internally reflected at one of said interrogation areas of the sample side, thereby generating a signal, the signal refracted back by the refraction side, through the aperture, the screen being movable relative the optical prism, within the screen plane, to shift the aperture and expose different portions of the field of illumination to corresponding ones of the interrogation areas; and a detector assembly configured to receive the signal from any one of the interrogation areas.

In accordance with another aspect, there is provided a method of optically interrogating a plurality of samples or sample portions, the method comprising: generating a field of illumination towards a refraction side of an optical prism, the optical prism also having an opposite sample side, intersecting the collimated field of illumination with a screen having an aperture, the screen shielding the optical prism from at least a first portion of the field of illumination, and allowing at least a second portion of the field of illumination to reach the optical prism through the aperture, said second portion being refracted by said refraction side, totally internally reflected by the sample side thereby generating a signal via interaction with a first one of the samples or sample portions, the signal being refracted by the refraction side and propagating back through the aperture; and moving at least one of the screen and the optical prism relative the field of illumination to expose a second one of the samples or sample portions to a corresponding portion of the field of illumination, and thereby generating a second signal propagating back through the aperture.

In accordance with another aspect, there is provided an optical interrogation system comprising a support configured to hold at least one sample, the support having a plurality of interrogation areas, a source assembly generating a field of illumination towards the sample support, the field of illumination spanning the plurality of interrogation areas and configured to generate a signal upon interacting with the sample, a detector assembly configured to receive the signal, and a screen disposed in a screen plane parallel to the interrogation areas, the screen having an aperture establishing an optical path specifically aligned with a corresponding one of the interrogation areas between the field of illumination and the detector assembly, at least one of the screen and the support being moveable in an orientation parallel to the screen plane to shift the optical path from one of the interrogation areas to another.

In accordance with one aspect, there is provided an optical interrogation system comprising: an optical prism having two opposite sides including a sample side and a refraction side, the sample side having a plurality of interrogation areas; a source assembly generating a collimated field of illumination directed towards the refraction side; a screen disposed in a screen plane intersecting the field of illumination and shielding the refraction side from the field of illumination, the screen having an aperture allowing a portion of the field of illumination to reach and be refracted by the refraction side, be totally internally reflected at one of said interrogation areas of the sample side, thereby generating a signal, the signal refracted back through the aperture, the screen being movable within the screen plane to shift the aperture and expose different portions of the field of illumination to corresponding ones of the interrogation areas; and a detector assembly configured to receive the signal from any one of the interrogation areas.

In accordance with another aspect, there is provided a method of optically interrogating a plurality of samples or sample portions, the method comprising generating a collimated field of illumination towards a refraction side of an optical prism, the optical prism also having an opposite sample side, intersecting the collimated field of illumination with a screen having an aperture, the screen shielding the optical prism from the field of illumination except for a portion thereof extending through the aperture, said portion being refracted by said refraction side, totally internally reflected by the sample side thereby generating a signal via interaction with a first one of the samples or sample portions, the signal being refracted by the refraction side and propagating back through the aperture, the method further comprising moving the screen within a plane parallel to the sample side and repeating said signal generation on another one of the samples or sample portions with another portion of the field of illumination.

In accordance with another aspect, there is provided an optical interrogation system comprising a support configured to hold at least one sample, the support having a plurality of interrogation areas, a source assembly generating a field of illumination towards the sample support, the field of illumination spanning the plurality of interrogation areas and configured to generate a signal upon interacting with the sample, a detector assembly configured to receive the signal from any one of the interrogation domain positions, and a screen disposed in a screen plane parallel to the interrogation areas, the screen having an aperture and being moveable within the screen plane to shift the aperture between different interrogation positions, wherein in each one of the interrogation positions, an optical path specifically aligned with a corresponding one of the interrogation areas is established between the field of illumination and the detector assembly.

Many further features and combinations thereof concerning the present improvements will appear to those skilled in the art following a reading of the instant disclosure.

DESCRIPTION OF THE FIGURES

In the figures,

FIG. 1A is a view of a first example of an optical interrogation device.

FIGS. 2A to 2H includes a sequence of views of a second example of an optical interrogation device;

FIGS. 3A to 3C includes graphs representing the effect of changing the size of the aperture;

FIG. 4A is an example optical prism which can be used in the device of FIGS. 1A to 1C or 2A to 2H;

FIG. 8B is an oblique view showing the underside of a chip of the embodiment of FIG. 8A;

FIG. 11 is a cross-sectional view schematizing yet another example embodiment;

DETAILED DESCRIPTION

Figure 1B:
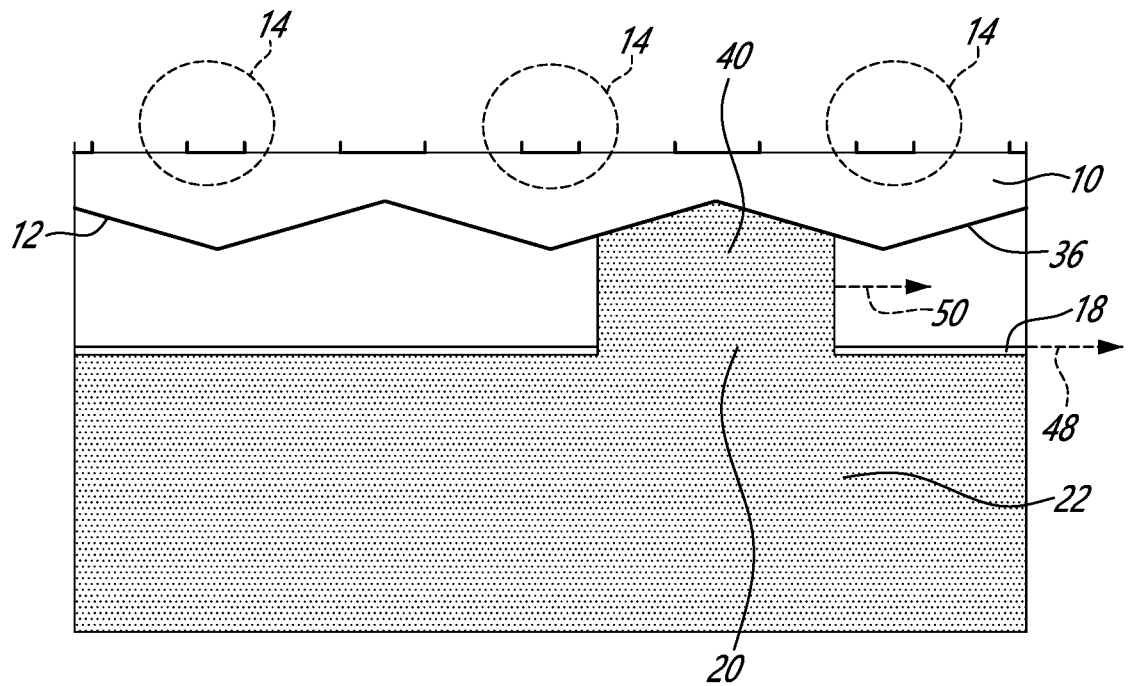
FIGS. 1B and 1C present example modes of operation thereof.

FIG. 1A schematically shows an example of a method of selectively interrogating one of a plurality of samples 34 or sample portions. The method involves using an optical prism 10 which has two opposite sides: a refraction side 32 and a sample side 16. The sample side 16 can be said to have a plurality of interrogation areas 14, each configured to be in contact with a corresponding one of the samples 34 or sample portions. The expression "samples or sample portions" is used herein because the different interrogation area 14 can receive respective portions of a same sample 34, or respective, different samples 34, depending on the embodiment. The refraction side 32 has sloping faces 36, which in this case are presented as adjacent V-shaped ridges 12, configured to direct, via refraction, the incident beam 40 into a total internal reflection with corresponding ones of the interrogation areas 14 of the sample side 16, where the evanescent wave 38 of the reflected beam interacts with the sample 34 and generates a signal 26. The sloping faces are also configured to direct the signal 26, again by refraction, back along the path of the incident light 42 beam.

A field of illumination 22, which can be a beam of infrared light for instance, is directed towards the refraction side 32. The field of illumination 22 can span a plurality of interrogation areas 14. A screen 18, provided here in the form of a thin, sheet-like component, is positioned across the path of the field of illumination 22. The screen 18 is opaque to the wavelengths of the field of illumination 22 and can shield portions of the optical prism 10 from the field of illumination 22. The portion of the field of illumination which is blocked by the screen can be referred to as the first portion 44. The screen has one or more apertures 20, one of which will be looked at here as an example, in the understanding that similar principles can be repeated for a plurality of apertures 20 if desired. The aperture 20 allows a second portion 46 of the field of illumination 22, which can be referred to as the incident light beam 40, to reach a restricted portion of the prism 10 where it is guided to interact with the sample 34. In this example, the prism 10 has a plurality of parallel V-shaped ridges 12, each associated to a respective one of a plurality of parallel elongated interrogation areas 14, and the aperture 20 is in the form of a slit. The V-shaped ridges 12 refract the incident beam 40 in a manner to generate the total internal reflection at the prism surface 30 and generation of the signal 26, and to redirect the signal 26 back across the slit 20. In this example, the screen 18 is planar and can thus be said to be disposed within a virtual screen plane 28 which extends transversally relative to the incident beam 40, and even precisely perpendicularly relative to the incident beam 40 in this example.

In this example, the screen 18 is configured in a manner to be movable within the screen plane 28, such as illustrated in FIG. 1B, such that the aperture 20 can be shifted to expose different portions of the field of illumination 22 to corresponding ones of the interrogation areas 34. In this specific example, the screen 18 can be moved 48 in a manner to shift the aperture 20 into alignment with another one of the interrogation areas 14 either to the left or to the right. In this case, the movement 48 of the screen 18 provides a shift in the aperture 20, which in turn results in a displacement of the incident beam 40 relative to the field of illumination 22 while keeping the prism 10 fixed.

Several variations are possible. For instance, instead of moving the screen 18, and thereby the aperture 20, relative to the field of illumination 22, while keeping the optical prism 10 fixed relative to the field of illumination 22, it can be preferred in some embodiments to move 52 the optical prism 10 relative to the field of illumination 22 while keeping the screen 18 fixed relative to the field of illumination 22, such as schematized in FIG. 1C. In alternate embodiments, it can be desirable to displace both the optical prism 10 and the screen 18 in different orientations. All these variations can achieve the objective of shifting the incident beam 40 to a different interrogation area 14, and one or the other of these variations may be preferred over the others depending on the specificities of the embodiment. For instance, the aperture 20 movement can be coordinated with device movement to extend the spatial footprint of the scanning dimensions, to keep the aperture(s) within "bright spots" of the IR excitation beam, or both. In the latter case the IR beam can be tightly focused (increasing local brightness and therefore signal quality) such that the aperture creates a well-defined interrogation beam, while the device movement relative to this beam select the sample location to be interrogated, in one example embodiment.

Figure 1C:
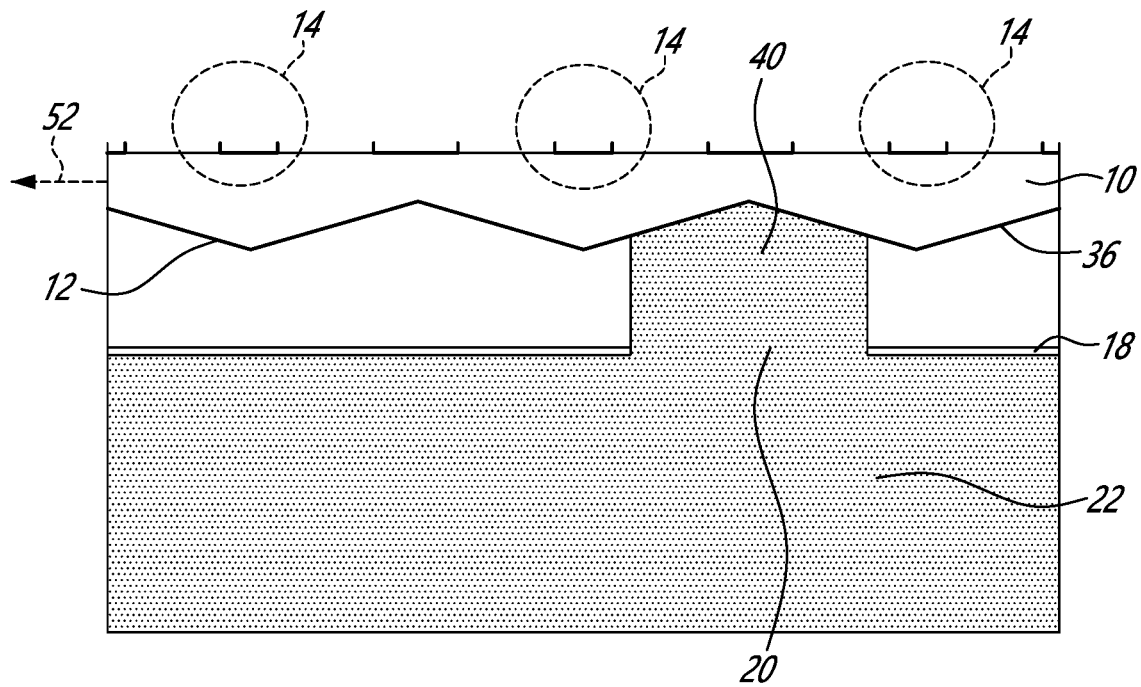

FIGS. 2A to 2H illustrates an embodiment similar to the embodiments shown in FIGS. 1A-1C, but configured in a manner to allow two interrogation areas 14 to be present for each one of the crests 56 in the refraction side 32 of the prism 10. More specifically, in this embodiment, a component referred to as a "chip" 54 includes a plurality of grooves 58 which can be positioned in alignment with the interrogation areas 14, in a manner that each groove 58 can be positioned under a respective sloping face 36 of the refraction side 32. The grooves 58 are formed in the side of the chip 60 which is placed in abutment against the sample side 16, and the grooves 58 can thus be closed by the sample side 16 of the prism 10 and form microfluidic channels 62 during use. The chip 54 can be made of an optical material such as glass for instance. The microfluidic channels 62 can remain open at both ends and be connected to respective inlets and outlets which can circulate corresponding samples in respective channels 62. Such a configuration can be useful for confining the samples within sample receiving areas 64, for instance, while allowing circulation of the samples in the sample receiving areas 64.

In an alternate embodiment, the sample receiving areas 64 can be formed in the sample side 16 of the optical prism itself, for example. Indeed, the company IRUBIS presents on its website an ATR crystal named "specialized 2" which has a plurality of microstructures formed in the sample side of the optical prism. The microstructures can be seen as an array of protrusions which protrude from a first level to a second level, forming corresponding channels/recesses between the protrusions, or can otherwise be seen as a plurality of sample receiving areas recessed from an otherwise planar surface of the sample side. The protrusions/recesses can be sized in a manner to selectively prevent some components from penetrating into the recesses, and to therefore act as a filter. For instance, adapted to blood analysis, the recesses can be formed and sized in a manner to allow plasma to penetrate them, but for red blood cells to be prevented from entering the recesses by the protrusions, due to their size. Accordingly, the sample side of the prism can have a plurality of microstructured sample-receiving areas recessed from an otherwise planar surface, in some embodiments.

It will be understood that in embodiments where this is suitable, a thin, continuous or discontinuous, metal layer can be positioned between the optical prism and the sample as this can amplify the electric field and hence, sensitivity. One example where this can be useful is when performing surface-enhanced infrared absorption spectroscopy (SEIRAS), for instance. Accordingly, the sample side of the prism can be covered by a thin metal layer configured to amplify the electric field to achieve SEIRAS. It so happens that the "specialized 2" ATR crystal from the company IRUBIS referred to above combines the filtering function and the SEIRAS function, but such functions can be implemented independently from one another depending on the embodiment.

The sequence of FIG. 2A to FIG. 2H shows the progressive shifting 66 of the slit (aperture) 20 towards the right hand side, from alignment with a crest 56 to alignment with a valley 72, and the effect on the optical path configuration. It is representative of the effect on the optical path of shifting from the crest 56 to the valley 72 towards the left. At the positions shown in FIGS. 2B, 2C, 2D, and 2E, the incident beam 40 totally internally reflects with the corresponding interrogation area 68, and its evanescent wave 70 can thus interact with the sample. The strongest signal can perhaps be obtained in the positions as shown in FIGS. 2C and 2D which have a greater overlap between the incident beam 40 and the interrogation area 68. At the position shown in FIG. 2A, the incident beam may somewhat interact with both sample areas 14 associated to that crest 56, which may not be suitable in some applications, whereas in the positions as shown in FIGS. 2F, 2G and 2H, there is no interaction with any one of the interrogation areas 14 corresponding with the microfluidic channels 62, given the relative sizes and configurations of the aperture 20, the crest 56, and the interrogation areas 14. The best levels of interaction with the interrogation area on the left hand side can be achieved in the positions of the aperture corresponding to the mirror images of the positions as shown in FIGS. 2C and 2D, where good signal levels can be achieved without any risk of confusion or contamination with the right hand side interrogation area or sample.

The sequence of FIGS. 2A to 2H, and in particular the positions as shown in FIGS. 2B, 2C, 2D, and 2E, illustrate that a certain tolerance is allowed on the exact positioning/alignment of the aperture/slit 20 relative to the prism 10, while still allowing to receive a good signal. In this embodiment, where the crest-to-crest distance 74 is of roughly 0.7 mm, and the width 76 of the aperture 20 was of roughly 0.5 mm, the tolerance can be in the order of 0.05 mm for instance. In practice, achieving such a degree of precision on moving components can be a challenge. If the mechanical components used to move the aperture 20 relative to the prism 10 are not precise enough, occurrences of misalignment may become common. This challenged was addressed, in this case, given the construction of the screen 18 and the mechanical components which are used to slide it precisely along rails. Example mechanical components to this end will be presented in greater detail below. Before then, we will explore the various considerations which may affect the choice of the width 76 of the aperture 20. It will be noted that in FIGS. 2A to 2H, the interval of displacement between positions is of 0.05 mm.

Indeed, various factors may be taken into consideration in the choice of the width 76 of the aperture 20 for a given embodiment. First, one may wish to maximise the amount of available interrogation areas 14 (e.g. portion of sample side 16 in contact with a channel 62) which can be independently interrogated. For each channel 62, it is desired that the entire measurement zone be within it for a given aperture position. Moreover, for each measurement in a channel 62, the measurement zone must be large enough to generate a good signal. In this context, the measurement zone can correspond to the portion of the sample which is illuminated and which is viewed by the detector. The size of the channels 62 can be slightly superior to the width of the measurement zone to allow a positioning tolerance. Finally, the walls 78 between the channels should not be too thin, to preserve a suitable amount of structural integrity.

FIGS. 3A to 3C presents simulation results showing the measurement zone (x-axis, mm) as a function of the position of a slit (y-axis, mm), for slit widths of 0.5 mm in FIG. 3A, 1.0 mm in FIG. 3B, and 1.5 mm in FIG. 3C. In the context of an example prism 100 such as shown in FIG. 4A, the prism has 7 mm in width and 10 crests. An example positioning of channels is shown by rectangles identified by arrows in graphics of FIGS. 3A to 3C. For the 0.5 mm slit as shown in FIG. 3A, it is possible to achieve two channels per crest, for a total of 18 channels in contact with the prism (crystal). Moreover, for certain positions of the slit, there are no measurement zones. For the 1 mm slit (FIG. 3B), it is only possible to achieve one channel per crest, for a total of 9 channels for one prism. For a given slit position, the measurement zone is unitary (e.g. 0 mm) or segmented (e.g. 0.35 mm). There are no slit positions which offer no measurement zone. For a 1.5 mm slit (FIG. 3C), it is not possible to have one channel per crest because the measurement zone always extends over two crests. For each slit position, the measurement zone is fractioned in two or three sections. Table 1, below, presents a summary of the number of sections of measurement zone and of the number of possible channels per crest for different widths of slits.

TABLE 1

| Slit width interval (mm) | Sections of measurement zone(s) | Number of channels per crest |
| --- | --- | --- |
| 0 to 0.35 | 0 | 0 |
| 0.36 to 0.70 | 0 or 1 | up to 2 |
| 0.71 to 1.4 | 1 or 2 | up to 1 |
| 1.41 to 2.1 | 2 or 3 | less than 1 |

In the specific context of the prism contemplated, the ideal slit width is between 0.36 mm and 0.7 mm. For a smaller slit width (e.g. 0.36 mm), the measurement zone is not wide and the signal to noise ratio of the measurements is small. It is preferable to achieve a larger measurement zone. For a larger slit width (e.g. 0.7 mm), the signal to noise ratio is large, the channels are larger and thus the walls between the channels need to be smaller (e.g. 0.05 mm), which may not offer enough integrity. A slit width of 0.5 mm offers a good compromise with a suitable signal to noise ratio and a wall width of 0.12 mm for 0.2 mm wide channels, and was found preferable in this embodiment. In alternate embodiments, different prisms, having different shape, size or configuration, can be used, and the size, shape and configuration of the aperture can be adapted accordingly.

Figure 4B:
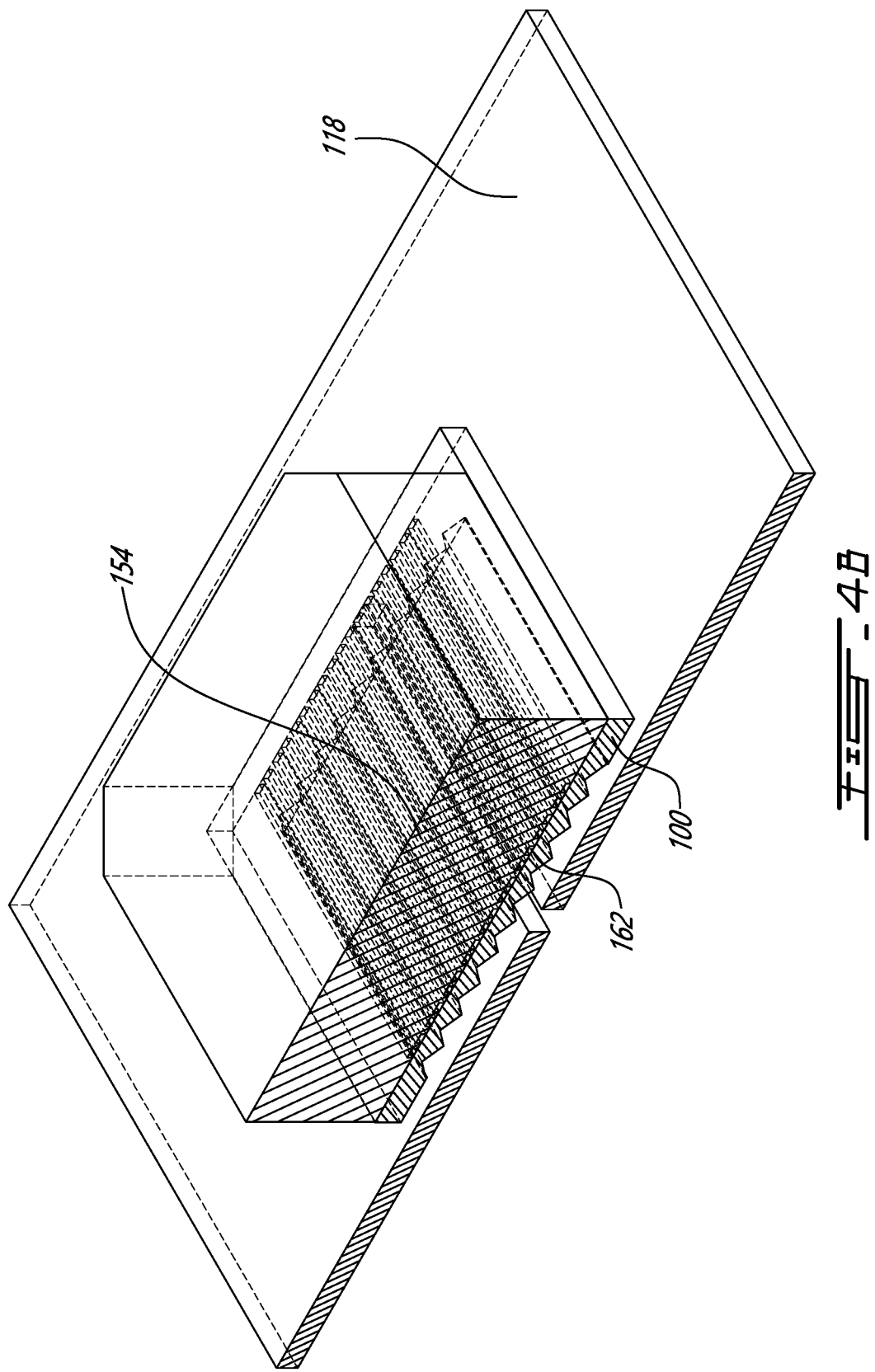
FIG. 4B is a fragmented oblique view showing the device of FIGS. 2A to 2H.

FIG. 4B presents a fragmented view taken along a central cross-section showing an example relative position relationship between a screen 118, a prism 100, and a chip 154 having channels 162, for the example prism 100 presented in FIG. 4A.

Figure 5:
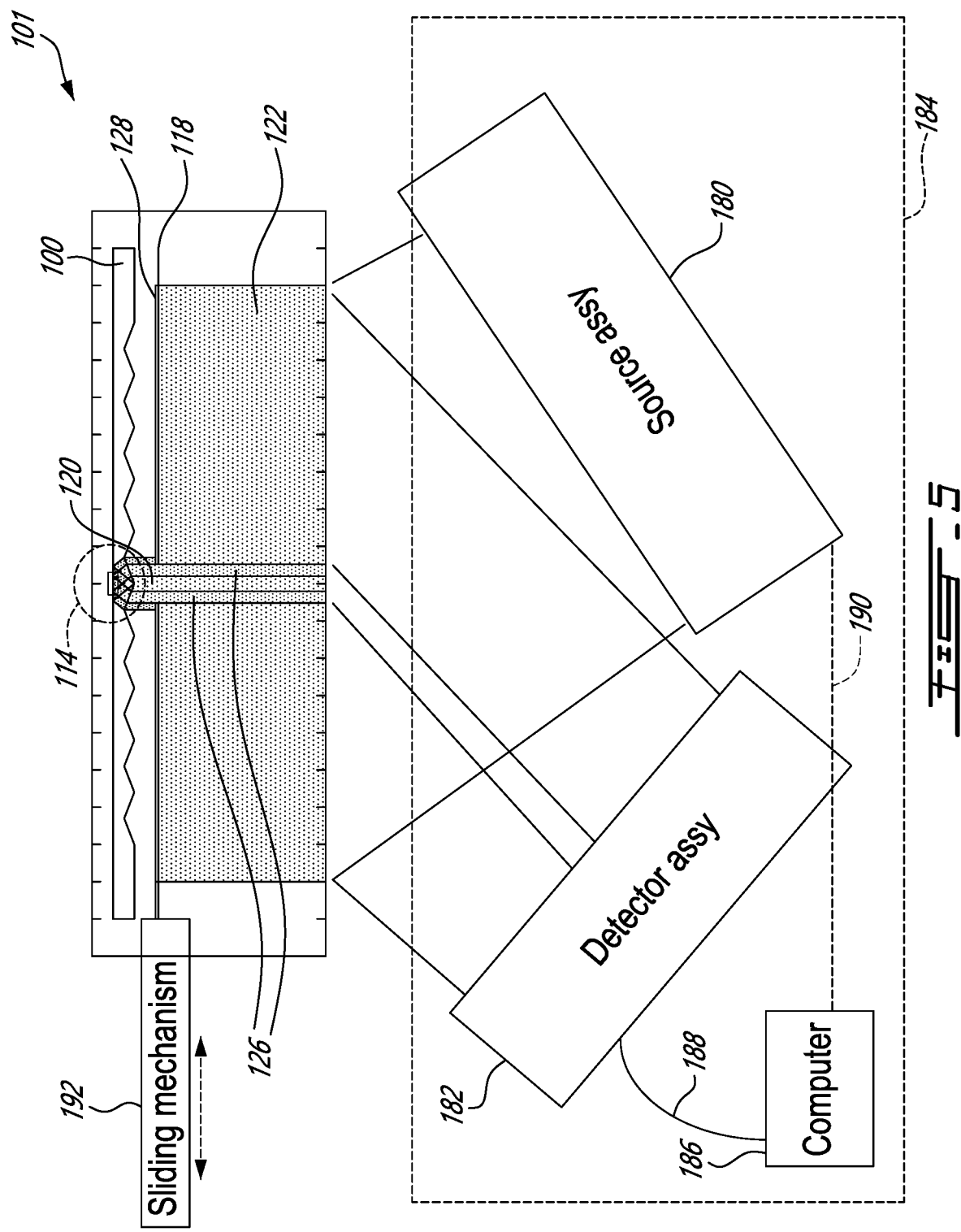
FIG. 5 is a schematic view showing a system integrating the device of FIGS. 2A to 2H.

Referring now to FIG. 5, an example system 101 using the prism 100 and screen 118 with an aperture 120 of FIG. 4B in the context of ATR-IR spectroscopy is schematically presented. In this system 101, the excitation, forming the field of illumination 122 is generated and optically guided by a source assembly 180, and the signal 126 generated in the corresponding interrogation area 114 is optically guided and received by a detector assembly 182. Both the source assembly 180 and the detector assembly 182 can form part of a spectrometer 184, which can additionally have some form or another of computer 186 which can receive the input 188 from the detector assembly 182, perform Fourier transformation and measurements, display, store, and/or transmit results or related data, and which can further be used as a controller 190 for the source assembly 180, for instance. Although schematically shown separated, the detector assembly 182 and the source assembly 180 can share components, an example of which will be presented below. The system 101 can have some form of housing or frame which holds the prism 100 and the plane of the screen 118 in a fixed relationship with the optics of the source 180 and detector assemblies 182, and a sliding mechanism 192 which provides for relatively precise movement of the screen 118 within the screen plane 128, an example of which will be presented below.

Figure 6A:
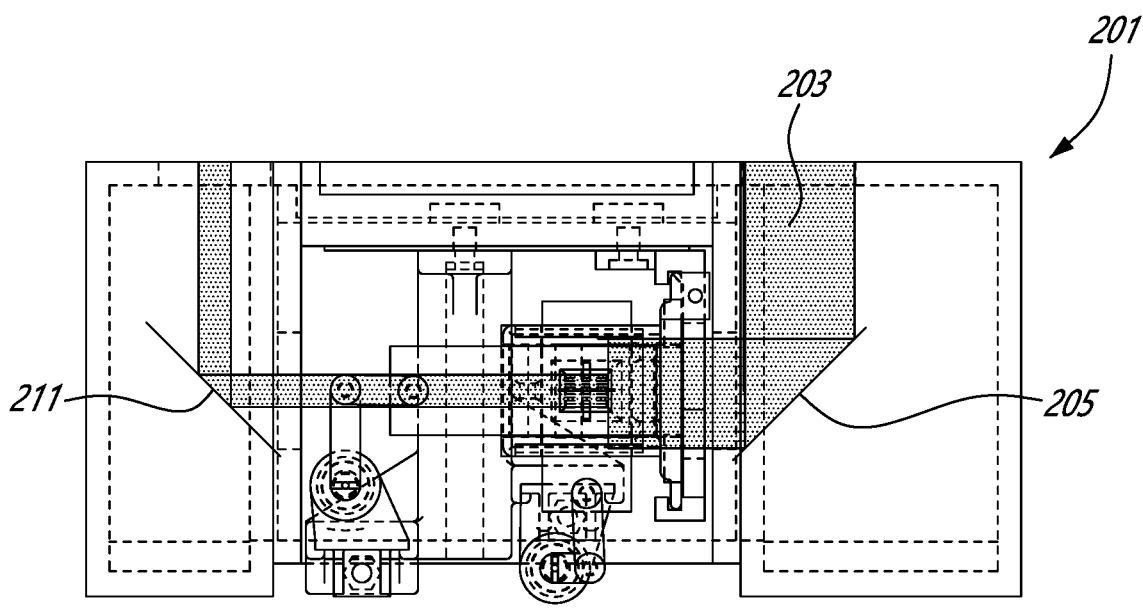
FIGS. 6A and 6B show example optical path of a system such as presented in FIG. 5, including a top view and a side view, respectively.
Figure 6B:
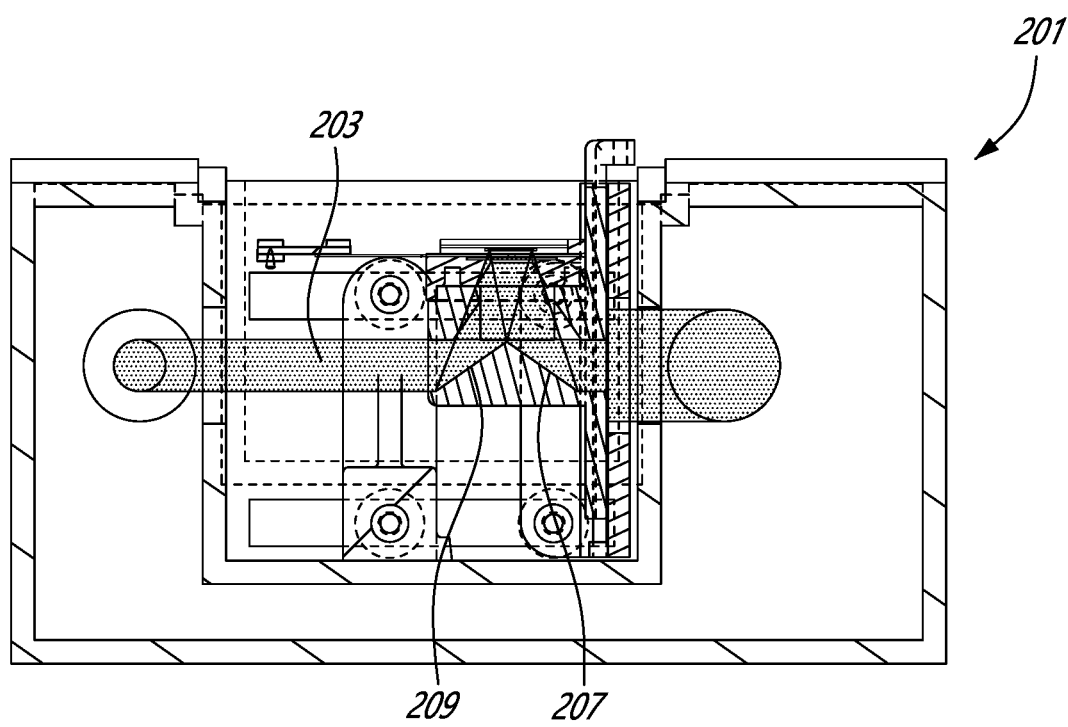

FIGS. 6A and 6B present optical paths 203 for an example system 201. In this example, the source is on the right hand side, and the detector is on the left hand side. FIG. 6A presents a top plan view; and FIG. 6B presents a side view. In this example, the excitation source and detector, not shown, are both mounted to the same side of the system 201 and mirrors are used to delimit the optical path 203. A first mirror 205 is used to create a 90° elbow in a horizontal plane, and a second mirror 207 is used to create a ~80° elbow in a vertical plane. At this point, the radiation entirely spans the prism, but most of it is blocked by the screen. Only a portion of the excitation radiation penetrates the screen through the aperture. Since it is slightly slanted off vertical, it is also totally internally reflected and then refracted into a path which is slightly slanted off vertical in the other direction, splitting out from the incoming radiation path and leading the signal to a third mirror 209 causing a symmetrical ~80° elbow in the vertical plane. A fourth mirror 211 is used to cause a 90° elbow in the horizontal plane leading the signal into a path which is parallel, and offset, from the initial excitation radiation path, and to the detector (not shown). In this embodiment, the second 207 and third 209 mirrors are corresponding surfaces of a crested reflective element which serves both as a component of the source assembly and as a component of the detector assembly. Various alternate embodiments are possible. The excitation path can lead to a housing which can hold the prism, the chip, and the screen, and incorporate a screen sliding mechanism which allows to move the screen relative to the prism and the chip, for instance.

Figure 7A:
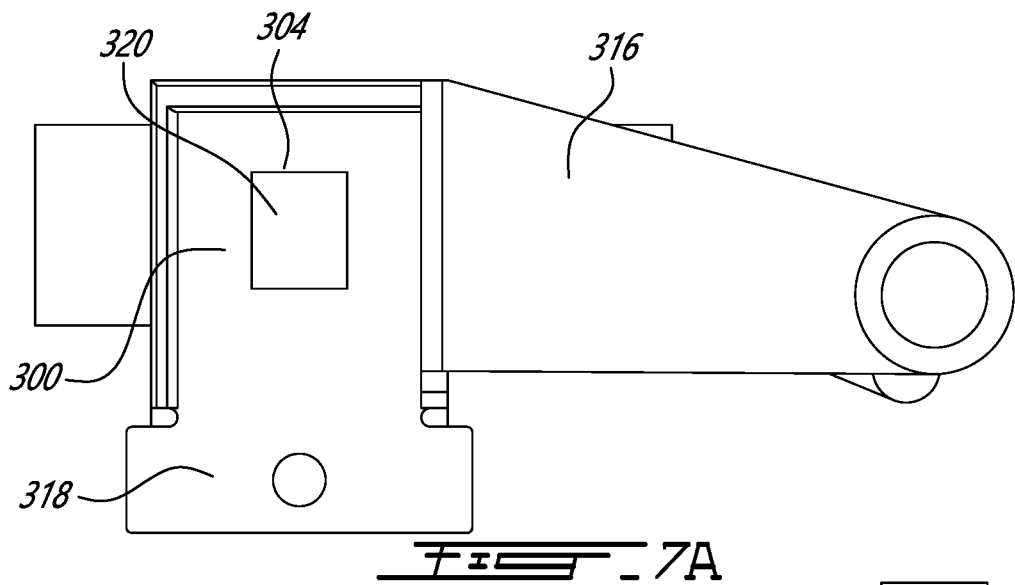
FIGS. 7A, 7B, and 7C are top, side, and bottom views, respectively, of an example housing including a sliding mechanism for use in a system such as presented in FIG. 5.
Figure 7B:
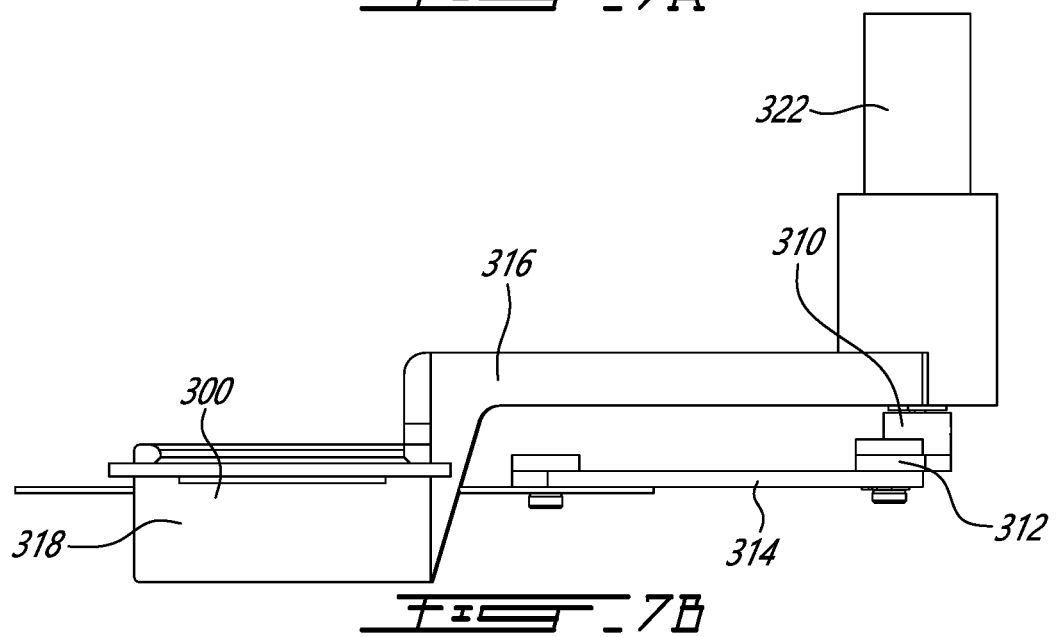
Figure 7C:
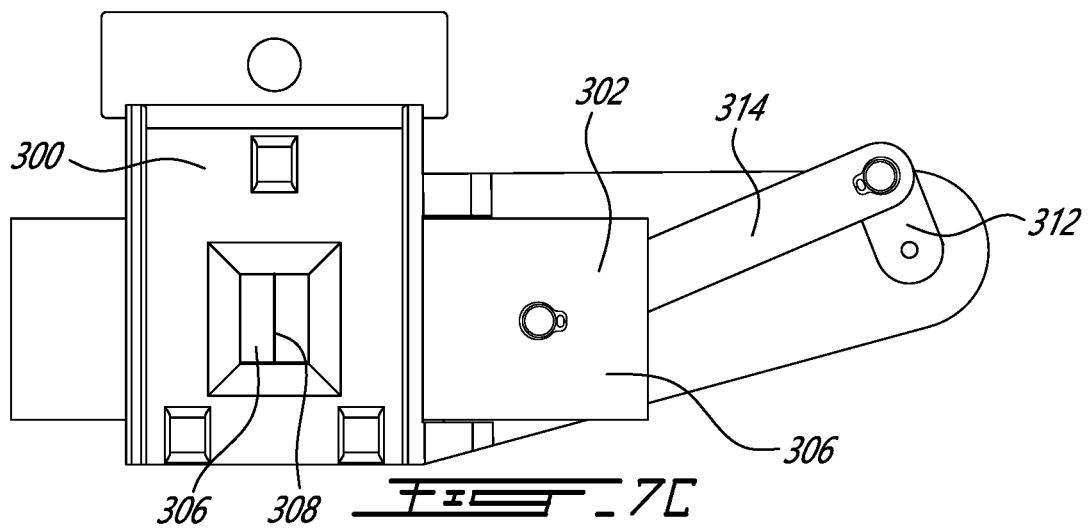

FIGS. 7A to 7C present an example housing 300 incorporating a screen sliding mechanism 302 and a prism holder 304. As perhaps best seen in FIG. 7C, the screen is provided here in the form of an elongated plaque 306 having a slit 308 defined therethrough. The plaque 306 is slidingly mounted between two rails, both in the form of inwardly facing C-shaped channels receiving the thickness of the plaque 306 with a limited amount of play. A servomotor 322 is secured to the housing structure with a rotary shaft 310 oriented normal to, and offset from, the prism's sample side. The rotary shaft 310 has a radially oriented arm 312 at its tip. A connecting rod 314 is pivotally mounted at both ends i) to the distal end of the arm 312 and ii) to the plaque 306, in a manner that upon rotation of the shaft 310, the plaque 306 is pulled or pushed in a manner to slide within the rails, in a manner generally reminiscing the way a piston is moved in an automobile engine. Accordingly, inasmuch as the servomotor 322 has a suitable degree of precision, the plaque 306, with its slit 308, can be delicately and precisely moved in a manner to scan the prism.

More specifically, the housing can have a support 316 which can be manufactured by machining or 3D printing or any other suitable means for instance, and which can be placed inside a spectrometer accessory socket. The support 316 can have a prism support 318 onto which the prism 320, an ATR crystal in this case, if fixed. The prism support 318 and the prism 320 can be obtained from IRUBIS in this embodiment. The servomotor 322 displaces the plaque 306 with the slit 308 via the sliding mechanism. The plaque 306 with the slit 308 slides in an area of the support 316 designed for this purpose. The slit 308 allows defocalized or collimated excitation radiation incoming from the spectrometer to reach the prism 320. The sample can be positioned on the other side of the prism 320. The servomotor 322 can be calibrated to ensure that the position of the slit 308 relative to the crests of the prism 320 can be precisely known at all times (this can be achieved within the order of 5 µm in this example). Accordingly, a spectroscopic cartography can be realized (in any suitable wavelength, IR or other) with one or more mobile aperture to selectively admit the excitation radiation successively onto specific portions of the prism 320. Appropriate software can allow for the automated sequence of measurements to be spaced from one another not only spatially, but also temporally. Multiple samples can be conveyed onto the prism using an appropriate chip having microfluidic channels, or can be simultaneously held onto the chip using an appropriate chip having a plurality of wells, for instance. Ultimately, measurements can be taken from several samples and compared to one another essentially in real time, or multiple samples can be analyzed in parallel for detecting the presence of different chemical signatures, for instance. The system can be used, for instance, in the establishment of diagnostics of different health issues via the spectral signature of viruses, in medical laboratories, for instance. The system can be used to perform dimensional analysis by spectrometry in an automated manner, and can be used, for instance, to compare the parallel temporal evolution of multiple samples subjected to the same environmental constraints, or for fast analysis of multiple samples, simultaneously. The device can be adapted for rapid detection of a virus in blood or saliva samples, for instance. The samples can be relatively small, which can be advantageous in many scenarios. The system can be used to perform low-cost analyses, very quickly, in some embodiments.

It will be understood that various alternate embodiments are possible. One example is using two slits which move in orthogonal axes in a manner to allow scanning to many positions along both axes. An example is presented in FIG. 8A, where a first plaque 400 is provided with a first slit 402 oriented transversal to the orientation of the prism's 406 crests 404, and a second plaque 408, superposed to the first plaque 400, is provided with a second slit 410 oriented parallel to the orientation of the prism's 406 crest 404. In this manner, an array of wells 416 can be provided in the chip 412/sample holder, and these wells 416 can be scanned by operating both plaques 400, 408 in a manner to slide 414 transversally relative to the orientation of their respective slit 402, 410. As presented above, in other alternate embodiments, wells or channels can be formed in the sample side of the optical prism, for instance. Independently of how they are implemented in a particular embodiment, wells or channels can be open or closed, and in some embodiments, it can be preferred to have one or more open well or channel, and one or more closed well or channel, exposed to the same sample side of the prism, for instance.

Figure 8A:
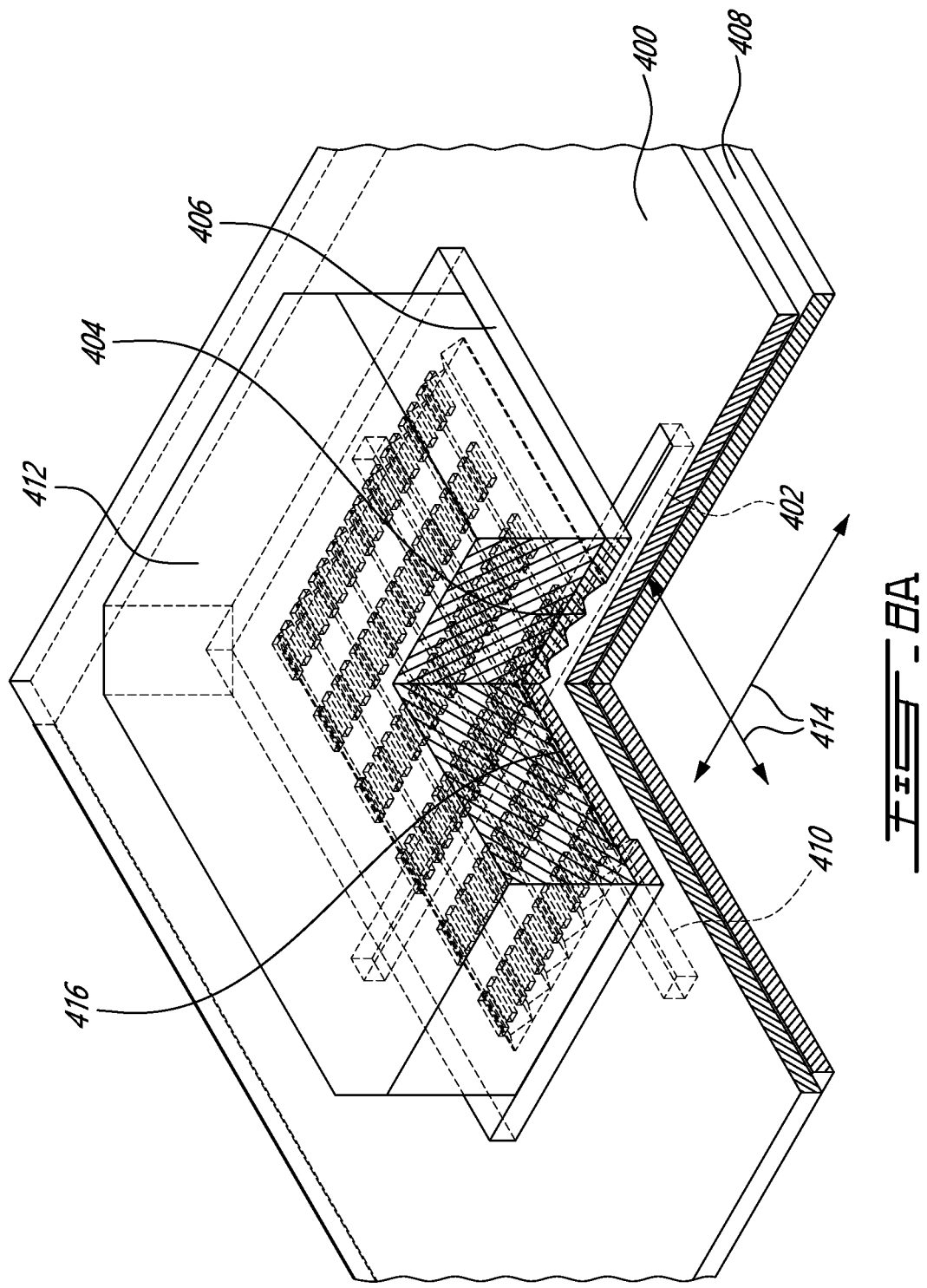
FIG. 8A presents an alternate embodiment to the embodiment presented in FIG. 4A, having two orthogonally oriented slits slidable in orthogonal orientations.
Figure 88:
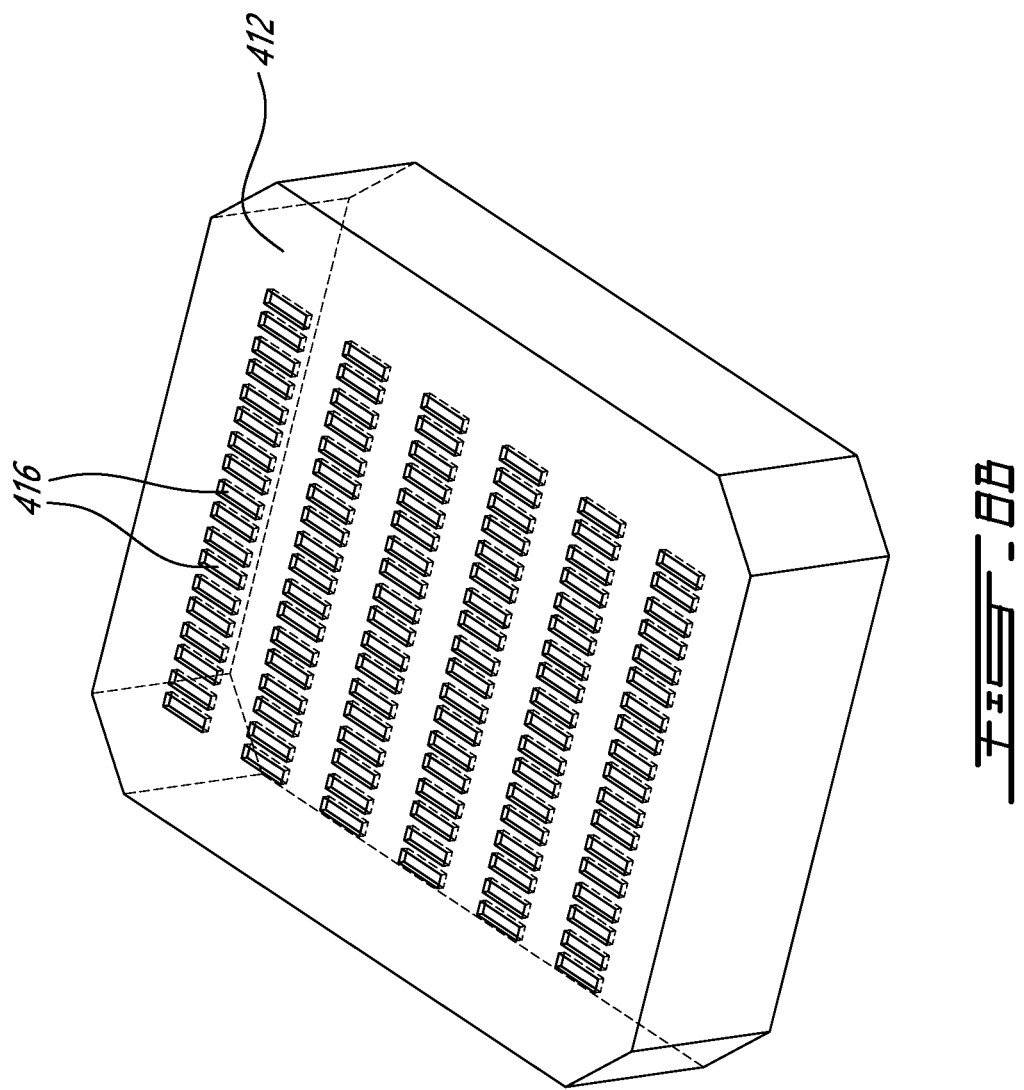

In an embodiment such as presented in FIG. 8A, it can be preferable to use a chip 412 forming a plurality of wells 416 for corresponding samples, an example of which is presented in FIG. 8B. More specifically, in this example, the chip has 108 wells 416, each of which can be made to coincide with a corresponding one of the interrogation areas and being individually optically interrogatable by the system.

Figure 9A:
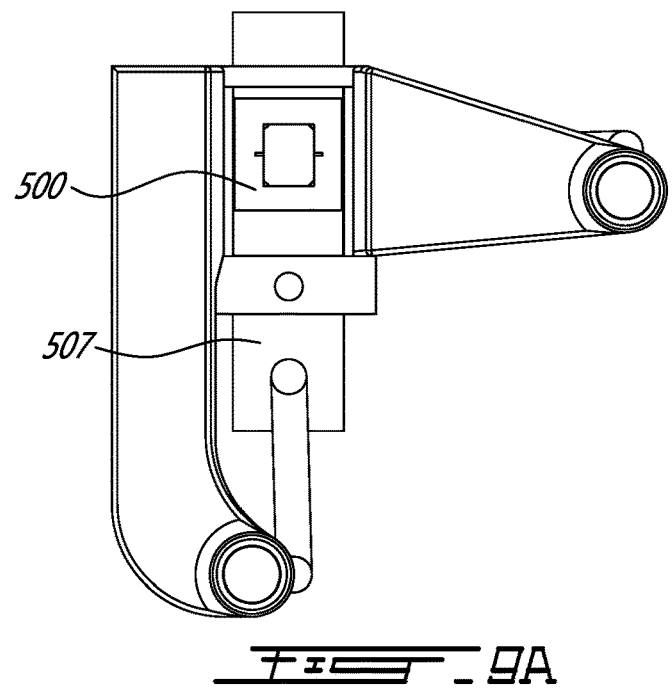
FIGS. 9A, 9B, and 9C are top, side and bottom views, respectively, of an example housing including two orthogonal sliding mechanisms for use with a device such as presented in FIG. 8A.
Figure 9B:
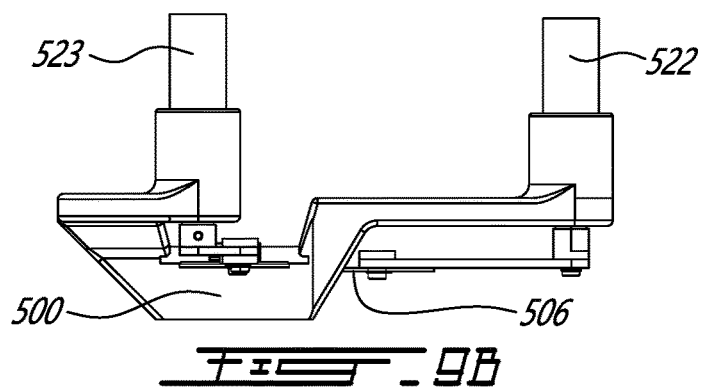
Figure 9C:
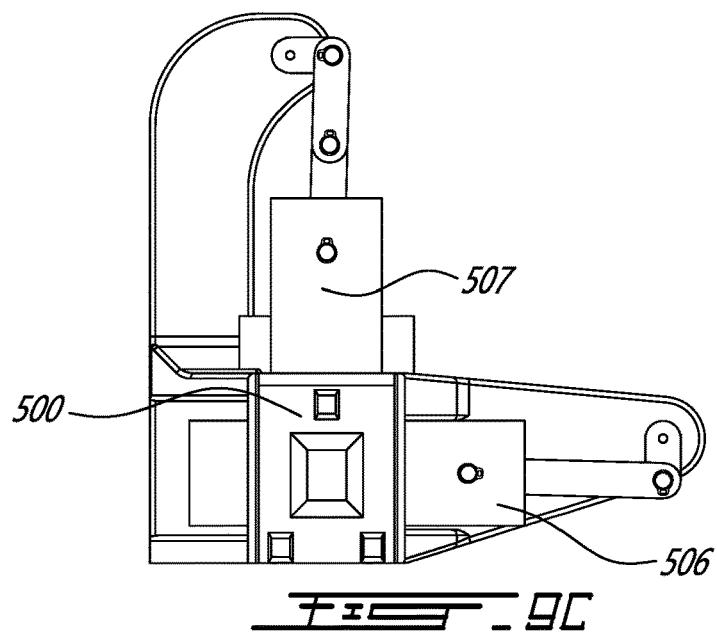

An example sliding mechanism which is configured to allow the movement along two orthogonal axes referred to above is presented in FIGS. 9A-9C. The housing 500 bears similarities to the housing 300 presented earlier in FIGS. 7A-7C, but it will be noted that two plaques 506, 507 are used, both superposed to one another and oriented orthogonally relative to the other, with corresponding sets of rails, and corresponding sliding mechanisms including their respective servomotor 522, 523. Such an embodiment could be useful, for instance, in following the evolution of a chemical reaction at different positions along a channel, to see how the reaction evolves, particularly if the reaction evolves along the length of the channel.

As can be understood, the examples described above and illustrated are intended to be exemplary only, and various alternate embodiments and adaptations are possible.

Figure 10:
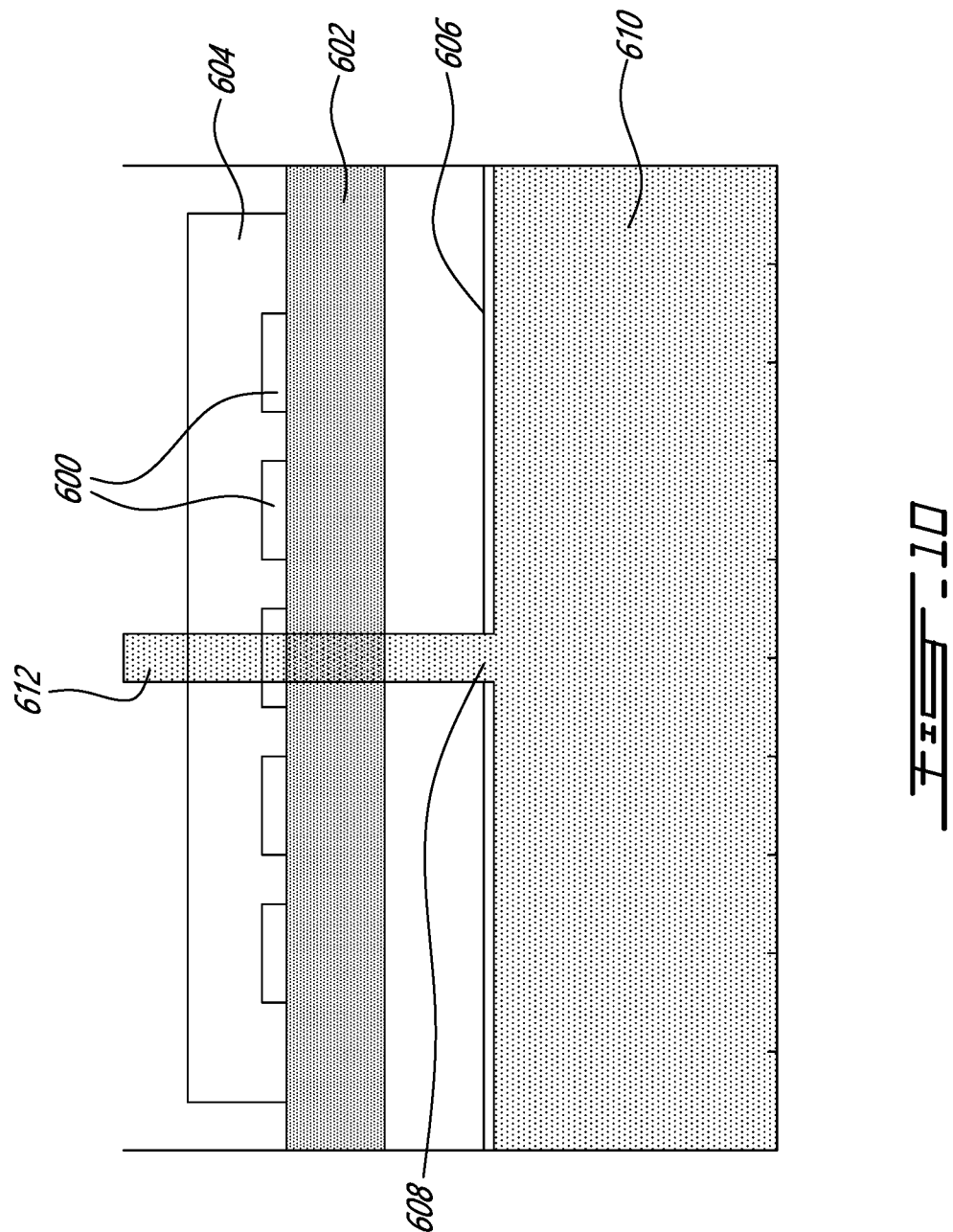
FIG. 10 presents an alternative embodiment to the one presented in FIG. 1.

For instance, in the embodiments presented above, the uniform source radiation spanning the samples or sample portions is used in combination with an ATR interrogation technique, in which the impinging excitation radiation is totally internally reflected and the signal travels back through the aperture(s). It will be understood that in alternate embodiments, the interrogation technique can be based on transmission across the sample, rather than by reflection. An example of such a technique is presented in FIG. 10. As shown in FIG. 10, the samples, or sample portions, can be received on a glass slide 602. They can be locked in position on the glass slide 602 by wells defined in the glass slide, or by channels 600 defined in a chip 604 which is placed in abutment with the glass slide 602, such as illustrated for instance. The screen 606, or more specifically its aperture 608, is used to allow only a portion of the excitation radiation 610 to reach the glass slide 602, and to encounter only one of the samples or sample portions. After interacting with the sample, the signal 612 can continue in the same orientation, on the other side of the sample, to be detected by a detector (not shown). In some embodiments, positioning the screen 606 between the excitation radiation 610 and the sample can be preferable to positioning the screen 606 between the sample and the detector (not shown), but it will be understood that in some alternate embodiments, it can nonetheless be preferred for the excitation radiation to entirely span and reach the samples or sample portions, and to use the screen 606 to allow only a portion of the signal 612 on the other side of the sample or sample portions to reach the detector (not shown). In such an embodiment as well, it can be preferred to move the samples, such as by moving the glass slide 602 which acts as the optical prism, relative to the field of illumination/excitation radiation 610, instead of moving the screen 606 relative to the glass slide 602 and field of illumination/excitation radiation 610, if found best suitable.

As discussed above, the field of illumination can consist of a uniform, collimated, or quasi collimated field of illumination in some embodiments. However, in other embodiments, the field of illumination can be converging or diverging. FIG. 11, for instance, presents an example embodiment where the field of illumination 700, which extends towards a receiving face 702 of the optical prism 704, possibly normal thereto, is a converging field of illumination. In such an embodiment, it can be preferred to provide the optical interrogation system with the ability to achieve relative movement between the optical prism 704 and the incident beam 706 along the orientation of the incident beam (e.g. z-axis) 708, such as to allow the optical prism 704 to move between positions Pz1, Pz2 and Pz3. It will be understood that in such an embodiment, if the dimension of the aperture 712 is constant, the width 710 (W) of the incident beam as perceived by the optical prism will vary as a function of the distance along axis Pz 708, and so will the perceived intensity. This may be suitable in some embodiments. A z-displacement option can enable the fine-tuning of the ATR crystal's intersection with the IR beam vis-à-vis the beam focal point. For example, it will be generally preferable to have the beam defocused at the ATR crystal's light coupling side, such that the light fills all potential aperture scan positions. Conversely, for spectrometers with low brightness IR sources or for spectrofluidic devices with large sensing footprints where defocusing to fill the entire area is not feasible, the z-position can be changed to focus the beam such that the device could be moved relative to the spot created by the focused beam through a stationary aperture. In fact, the z-direction motion system can be used to switch between focused and defocused beam modes as required. Such a mechanism can also or alternately correct for natural variances in beam focus positions between different spectrometers, or on a singular spectrometer which may present variability in the focal point due to drift/misalignment of onboard optical components, selection of different light sources, or changes to other internal settings (band pass filters, internal apertures, etc.).

Figure 12A:
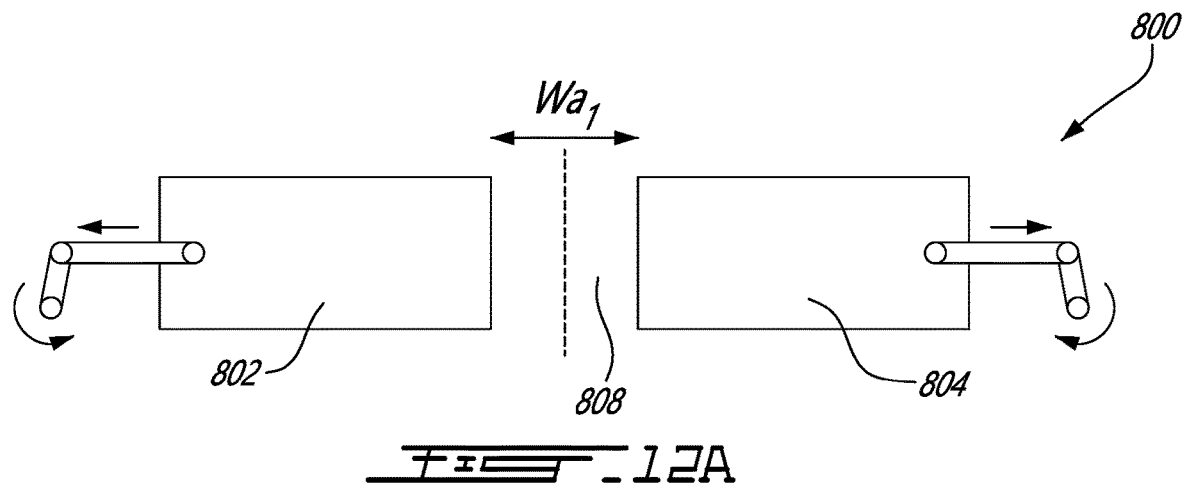
FIG. 12A to 12C are plan views schematizing yet another example embodiment.
Figure 12B:
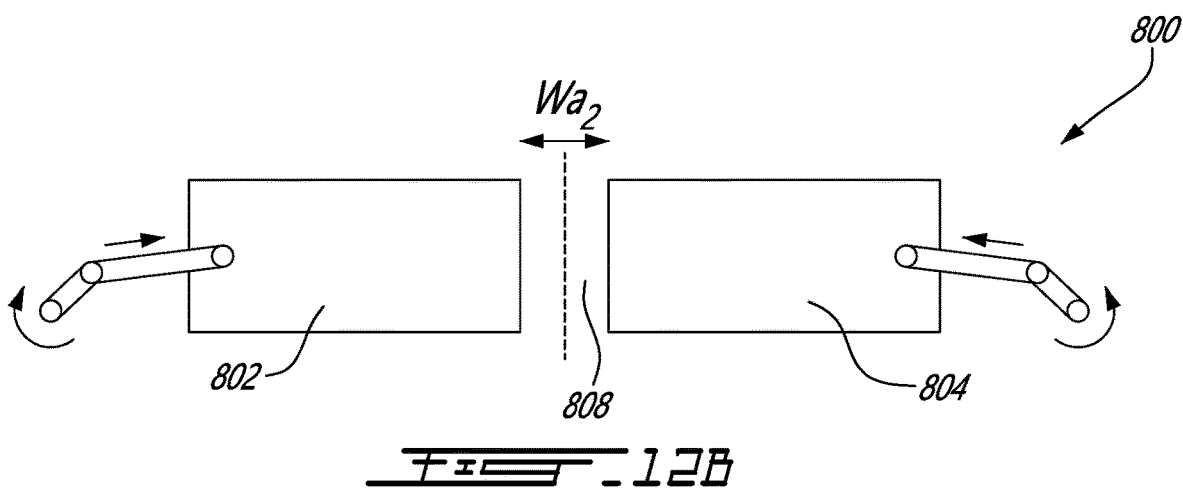
Figure 12C:
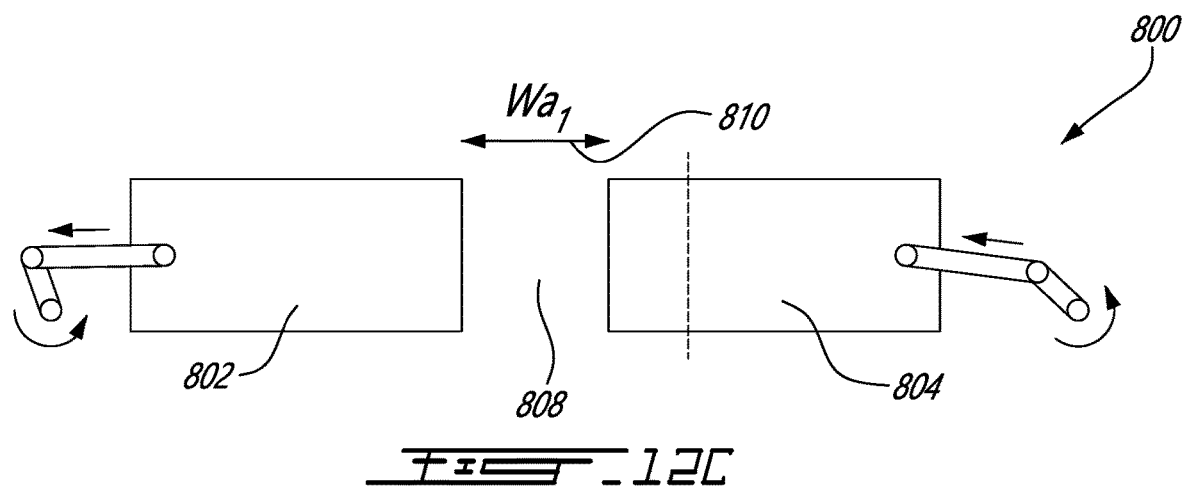

In still other embodiments, rather than using an aperture formed in a single sheet layer of a screen, it can be preferred to use a screen having of two or more components. Using two superposed layers having apertures oriented orthogonally and which can be moved in orthogonal directions, such as presented above, can allow scanning the surface of the optical prism along two axes rather than a single axis, for instance, and may be simpler than using a single sheet adapted to be moved in two orthogonal orientations. In other embodiments, further possibilities exist. For instance, as illustrated in FIGS. 12A to 12C, a given screen layer 800 can include two screen sheets 802, 804 which are independently moveable relative to one another along a same axis. As shown in FIGS. 12A and 12B, moving the screen sheets 802, 804 in opposite directions can allow to selectively broaden (FIG. 12A—away from one another) or narrow (FIG. 12B—towards one another) the size of the aperture (Wa) 808, which can allow changing the size of the aperture 808 for instance. In one embodiment, the screen can consist of two coplanar sheet-like halves 802, 804 forming an aperture 808 in the form of a slot there between, and the width 810 of the aperture 808 can be varied by moving the two halves 802, 804 towards or away from one another within their common plane. The aperture 808 can also be moved relative to the incident light beam, to target different interrogation areas of the optical prism, while keeping the same aperture size/width 810, by moving the two screen sheets 802, 804 by the same extent in the same orientation. It is understood that in alternate embodiments, the aperture 808 can be moved related to the incident light beam, to target different interrogation areas of the optical prism, while simultaneously adjusting the aperture size/width 810. This can be done in a similar way as disclosed above, where the two screen sheets 802, 804 can be moved either in the same or in different orientations and to different extents such as to target the desired interrogation area with the desired aperture size/width 810.

In another embodiment, not illustrated, the screen can consist of two layers stacked relative to one another, each having one or more slots, and individually moveable in a manner to control the degree of overlap between the slots of the two layers, thereby varying the size of the aperture. In still some other embodiments, screens having differently oriented apertures can be stacked and moved in different orientations to allow to displace the aperture and change the size of the aperture along more than one axis, to name still additional examples. In other words, the aperture can be achieved in another manner whereby two movable screen elements are separated by a certain distance. In this approach, the aperture width can be adjusted by controlling the distance between the edges of the two movable screens. A scan can be achieved by moving the centre point between the two screen edges while the aperture width is controlled based on the separation distance. In one operational mode, the distance between the two screens will be maintained during the scan. In another mode, the aperture width can be adjusted during a scan. In one embodiment, this approach can enable full control over measurement position and spatial resolution during any scan.

It will also be noted that the chip is optional. The use of a chip is but one example way of holding a sample in place relative to a prism. In one embodiment, the sample can be in the form of a tissue, or biofilm, for instance, which can be deposited directly onto a flat side of a prism, or onto a glass slide, for instance, and different portions of such a sample can be interrogated using any one of the techniques presented above, or variants thereof.

Similarly, while IR spectroscopy has many practical applications and is an easily identifiable potential application, it will be understood that the interrogation techniques described above, or variants thereof, can be used for other spectrums than the IR spectrum (e.g. visible, UV, Raman spectroscopy), and even for other applications than spectroscopy. In embodiments where it is desired to scan the samples or the sample portions along two axes, which can be orthogonal or not, the samples or sample portions can be disposed in a 2D array, and instead of using a prism which has elongated, parallel, regularly interspaced identical crests, it can be preferred to use a prism which has conical or pyramidal structures associated to different ones of the interrogation areas/samples or sample portions.

Moreover, while some specific examples presented above use a single aperture in the screen, it will be understood that some embodiments may benefit from using multiple apertures in one or more superposed screens. In one embodiment, the aperture can have a size above the diffraction limit of excitation light, for instance. Finally, it will be understood that the source radiation can take various forms, such as converging, diverging, collimated, or non-collimated beam, for instance.

Accordingly, the scope is indicated by the appended claims.

What is claimed is:

1. An optical interrogation system comprising:
   an optical prism having two opposite sides including a sample side and a refraction side, the sample side having a plurality of interrogation areas;
   a source assembly generating a field of illumination directed towards the refraction side;
   a screen disposed in a screen plane intersecting the field of illumination, the screen being opaque to the field of illumination, the screen having an aperture allowing a portion of the field of illumination to reach and be refracted by the refraction side, be totally internally reflected at one of said interrogation areas of the sample side, thereby generating a signal, the signal refracted back by the refraction side, through the aperture, the screen being movable relative the optical prism, within the screen plane, to shift the aperture and expose different portions of the field of illumination to corresponding ones of the interrogation areas; and
   a detector assembly configured to receive the signal from any one of the interrogation areas.

2. The optical interrogation system of claim 1 comprising a sliding mechanism configured to move the screen relative the optical prism and source assembly, while maintaining the optical prism fixed relative the source assembly.

3. The optical interrogation system of claim 1 comprising a sliding mechanism allowing to move the optical prism relative the screen and source assembly, while maintaining the screen fixed relative the source assembly.

4. The optical interrogation system of claim 1 wherein the screen includes two screen sheets both slidably mounted in the screen plane, the two screen sheets being individually movable relative one another in different directions within the screen plane in a manner to change the configuration of the aperture.

5. The optical interrogation system of claim 4 wherein the two screen sheets are adjacent one another and separated from one another by the aperture, and movable away and towards one another to change the size of the aperture.

6. The optical interrogation system of claim 4 wherein the two screen portions each have at least one aperture, the apertures being movable with the screen portions to modify the extent of the apertures by modifying the extent of the overlap.

7. The optical interrogation system of claim 4 wherein the two screen portions each have a corresponding slot, the slots in orthogonal orientations, the screen portions being movable in orthogonal orientations.

8. The optical interrogation system of claim 1 wherein the screen has a plurality of apertures, the field of illumination spanning the plurality of apertures.

9. The optical interrogation system of claim 1 further comprising a spectrometer, wherein the source assembly and the detector assembly form part of the spectrometer, the spectrometer further comprising a computer configured to perform the analysis of the signal detected by the detector assembly.

10. The optical interrogation system of claim 1 wherein the refraction side of the optical prism has a plurality of identical, regularly interspaced crests having a V-shaped cross-section.

11. The optical interrogation system of claim 10 wherein the aperture is in the form of a slit oriented transversally to a length of the crests.

12. The optical interrogation system of claim 11 wherein the slit has a width of more than half of, and not more than, a width of the V-shaped cross-section.

13. The optical interrogation system of claim 1 further comprising a chip having a plurality of sample-receiving areas recessed in a flat surface, the flat surface of the chip being positioned into abutment with the sample side of the optical prism, wherein the interrogation areas coincide with the sample-receiving areas of the chip.

14. The optical interrogation system of claim 13 wherein the sample-receiving areas are provided in the form of microfluidic channels, each channel having an inlet and an outlet.

15. The optical interrogation system of claim 14 wherein the aperture is in the form of a slit, the channels being oriented parallel to the slit.

16. The optical interrogation system of claim 1 wherein the sample side of the optical prism is covered by a metal layer configured to amplify the electric field in a manner to achieve surface enhanced infrared absorption spectroscopy.

17. The optical interrogation system of claim 1 wherein the screen is provided in the form of a plaque having two sliding edges received in corresponding rail channels formed in a housing, the housing receiving the optical prism, and a sliding mechanism configured to slide the plaque along the rail channels.

18. The optical interrogation system of claim 17 wherein the sliding mechanism includes a servomotor having a rotary shaft, an arm protruding radially from the rotary shaft, and a connecting rod pivotally connected at one end to a distal end of the arm, and pivotally connected at an opposite end to the plaque, in a manner to transfer rotary movement of the shaft into said sliding movement of the plaque.

19. A method of optically interrogating a plurality of samples or sample portions, the method comprising:
generating a field of illumination towards a refraction side of an optical prism, the optical prism also having an opposite sample side;
intersecting the collimated field of illumination with a screen having an aperture, the screen shielding the optical prism from at least a first portion of the field of illumination, and allowing at least a second portion of the field of illumination to reach the optical prism through the aperture;
said second portion being refracted by said refraction side, totally internally reflected by the sample side thereby generating a signal via interaction with a first one of the samples or sample portions, the signal being refracted by the refraction side and propagating back through the aperture; and
moving at least one of the screen and the optical prism relative the field of illumination to expose a second one of the samples or sample portions to a corresponding portion of the field of illumination, and thereby generating a second signal propagating back through the aperture.

20. The method of claim 19 further comprising performing a Fourier transform of the signal.

21. The method of claim 19 further comprising confining the plurality of samples or sample portions into contact with corresponding interrogation areas of the sample side via corresponding channels, comprising successively scanning the channels including said moving the screen between each channel.

22. The method of claim 21 wherein the plurality of samples or sample portions include different portions of a sample source exposed to respective, different ones of a plurality of reactive agents, in respective ones of the channels.

23. An optical interrogation system comprising a support configured to hold at least one sample, the support having a plurality of interrogation areas, a source assembly generating a field of illumination towards the sample support, the field of illumination spanning the plurality of interrogation areas and configured to generate a signal upon interacting with the sample, a detector assembly configured to receive the signal, and a screen disposed in a screen plane parallel to the interrogation areas, the screen having an aperture establishing an optical path specifically aligned with a corresponding one of the interrogation areas between the field of illumination and the detector assembly, at least one of the screen and the support being moveable in an orientation parallel to the screen plane to shift the optical path from one of the interrogation areas to another.

24. The optical interrogation system of claim 23 wherein the screen intersects the field of illumination and allows only a portion of the field of illumination to reach the sample support.

* * * * *